US012150036B2

(12) United States Patent
Bonnah et al.

(10) Patent No.: US 12,150,036 B2
(45) Date of Patent: Nov. 19, 2024

(54) DATA AND CONNECTIVITY MANAGEMENT SYSTEMS AND METHODS THEREOF

(71) Applicant: Honda Motor Co., Ltd., Tokyo (JP)

(72) Inventors: Jerry E. Bonnah, Huntington Beach, CA (US); David M. Kirsch, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 594 days.

(21) Appl. No.: 17/245,650

(22) Filed: Apr. 30, 2021

(65) Prior Publication Data

US 2022/0070761 A1 Mar. 3, 2022

Related U.S. Application Data

(63) Continuation-in-part of application No. 17/069,590, filed on Oct. 13, 2020, now Pat. No. 11,665,619.

(60) Provisional application No. 63/070,683, filed on Aug. 26, 2020.

(51) Int. Cl.
*H04W 48/04* (2009.01)
*H04W 12/088* (2021.01)
*H04W 76/11* (2018.01)

(52) U.S. Cl.
CPC ......... *H04W 48/04* (2013.01); *H04W 12/088* (2021.01); *H04W 76/11* (2018.02)

(58) Field of Classification Search
CPC ... H04W 48/04; H04W 12/088; H04W 8/005; H04W 76/11; H04W 4/40; H04W 8/186; H04L 63/0236; H04L 63/101
See application file for complete search history.

(56) References Cited

U.S. PATENT DOCUMENTS

| 7,583,801 | B2 | 9/2009 | Karina et al. |
| 7,602,808 | B2 | 10/2009 | Ullmann et al. |
| 7,653,753 | B2 | 1/2010 | Chen et al. |

(Continued)

FOREIGN PATENT DOCUMENTS

| CN | 109167780 | 1/2019 |
| WO | WO2005045603 | 5/2005 |

OTHER PUBLICATIONS

Office Action of U.S. Appl. No. 17/069,590 dated Mar. 1, 2022, 20 pages.

(Continued)

*Primary Examiner* — Jianye Wu
(74) *Attorney, Agent, or Firm* — RANKIN, HILL & CLARK LLP

(57) ABSTRACT

A system and method for processing a resource identifier request in a vehicle that includes receiving an application data access request from at least one of an in-vehicle device and a portable device. The system and method also include retrieving and analyzing an electronically stored allow list that is stored and updated based on a wireless data plan that is associated with the vehicle and determining accessibility of the application based on analysis of the allow list. The system and method further include assigning a router port of at least one router of a telematics communication unit of the vehicle to allow or disallow accessibility of the application based on determined accessibility of the application.

20 Claims, 13 Drawing Sheets

(56) References Cited

U.S. PATENT DOCUMENTS

| | | |
|---|---|---|
| 8,121,291 B2 | 2/2012 | Karina et al. |
| 8,145,120 B2 | 3/2012 | Vermola et al. |
| 8,374,958 B2 | 2/2013 | Blott et al. |
| 8,620,764 B2 | 12/2013 | Moritz et al. |
| 8,863,256 B1 | 10/2014 | Addepalli et al. |
| 9,286,384 B2 | 3/2016 | Kuper et al. |
| 9,319,381 B1 | 4/2016 | Jones et al. |
| 9,331,983 B2 | 5/2016 | Zhou et al. |
| 9,954,739 B2 | 4/2018 | Khanna |
| 10,057,022 B2 | 8/2018 | Yoganathan et al. |
| 10,104,525 B1 | 10/2018 | Kaiser et al. |
| 10,122,591 B1 | 11/2018 | Pack et al. |
| 10,360,296 B2 | 7/2019 | Greiner |
| 10,643,149 B2 | 5/2020 | Kukehalli Subramanya et al. |
| 10,691,683 B1 | 6/2020 | Sanchez et al. |
| 10,749,841 B2 | 8/2020 | Kulper et al. |
| 10,997,430 B1 | 5/2021 | Slavin |
| 2008/0120635 A1 | 5/2008 | Trimper et al. |
| 2010/0087167 A1 | 4/2010 | Tsurutome et al. |
| 2010/0117810 A1 | 5/2010 | Hagiwara et al. |
| 2011/0161667 A1 | 6/2011 | Poornachandran et al. |
| 2013/0132854 A1 | 5/2013 | Raleigh et al. |
| 2013/0205412 A1 | 8/2013 | Ricci |
| 2013/0304631 A1* | 11/2013 | Wang ...................... H04W 4/24 709/225 |
| 2013/0333039 A1 | 12/2013 | Kelly |
| 2016/0021001 A1 | 1/2016 | Nakagawa et al. |
| 2016/0088163 A1 | 3/2016 | Pattabiraman et al. |
| 2016/0205109 A1 | 7/2016 | Kohli et al. |
| 2017/0026231 A1 | 1/2017 | Poosala et al. |
| 2017/0134503 A1 | 5/2017 | Cho |
| 2017/0227965 A1* | 8/2017 | Decenzo ............... H04L 67/125 |
| 2018/0007099 A1* | 1/2018 | Ein-Gil ................. H04L 65/403 |
| 2018/0069898 A1 | 3/2018 | Pacifici et al. |
| 2021/0103955 A1 | 4/2021 | Kim et al. |

OTHER PUBLICATIONS

Notice of Allowance of U.S. Appl. No. 17/069,590 dated Jan. 12, 2023, 5 pages.

Office Action of U.S. Appl. No. 17/069,590 dated Jul. 7, 2022, 20 pages.

* cited by examiner

DATA AND CONNECTIVITY MANAGEMENT SYSTEMS AND METHODS THEREOF

CROSS-REFERENCE TO RELATED APPLICATION

This application is a continuation-in-part of U.S. application Ser. No. 17/069,590, filed on Oct. 13, 2020, which claims priority to U.S. Provisional Application Ser. No. 63/070,683 filed on Aug. 26, 2020, both of which are expressly incorporated herein by reference.

BACKGROUND

An embedded telematics control unit (TCU) may provide a vehicle with data access through a wireless connection. This wireless connection may enable video, music or content streaming. For example, video-style media may be streamed directly to a rear entertainment system (RES) of the vehicle via the wireless connection. The wireless connection from the TCU may also support singular or multiple devices within the vehicle data access, such as a connection to the World Wide Web through the Internet.

When an active data plan exists, either through a free trial period or a paid subscription, a third party billing service may receive the data access request from the TCU, verify the requesting vehicle's plan, and allow for access to the data. When no plan exists, typically through expiration of the free trial period, the data access may be denied by the third party billing service. The request may be redirected to a purchase option plan where oftentimes the plan is not renewed. Lost subscriptions may lead to reduced profit.

BRIEF DESCRIPTION

According to one aspect, a computer-implemented method for processing a resource identifier request in a vehicle that includes receiving an application data access request from at least one of an in-vehicle device and a portable device. The computer-implemented method also includes retrieving and analyzing an electronically stored allow list that is stored and updated based on a wireless data plan that is associated with the vehicle and determining accessibility of the application based on analysis of the allow list. The computer-implemented method further includes assigning a router port of at least one router of a telematics communication unit of the vehicle to allow or disallow accessibility of the application based on determined accessibility of the application.

According to another aspect, a system for processing a resource identifier request in a vehicle that includes a memory storing instructions when executed by a processor cause the processor to receive an application data access request from at least one of an in-vehicle device and a portable device. The instructions also cause the processor to retrieve and analyze an electronically stored allow list that is stored and updated based on a wireless data plan that is associated with the vehicle and determine accessibility of the application based on analysis of the allow list. The instructions further cause the processor to assign a router port of at least one router of a telematics communication unit of the vehicle to allow or disallow accessibility of the application based on determined accessibility of the application.

According to yet another aspect, a non-transitory computer readable storage medium storing instructions that when executed by a computer, which includes a processor perform a method that includes receiving an application data access request from at least one of an in-vehicle device and a portable device. The method also includes retrieving and analyzing an electronically stored allow list that is stored and updated based on a wireless data plan that is associated with the vehicle and determining accessibility of the application based on analysis of the allow list. The method further includes assigning a router port of at least one router of a telematics communication unit of the vehicle to allow or disallow accessibility of the application based on determined accessibility of the application.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
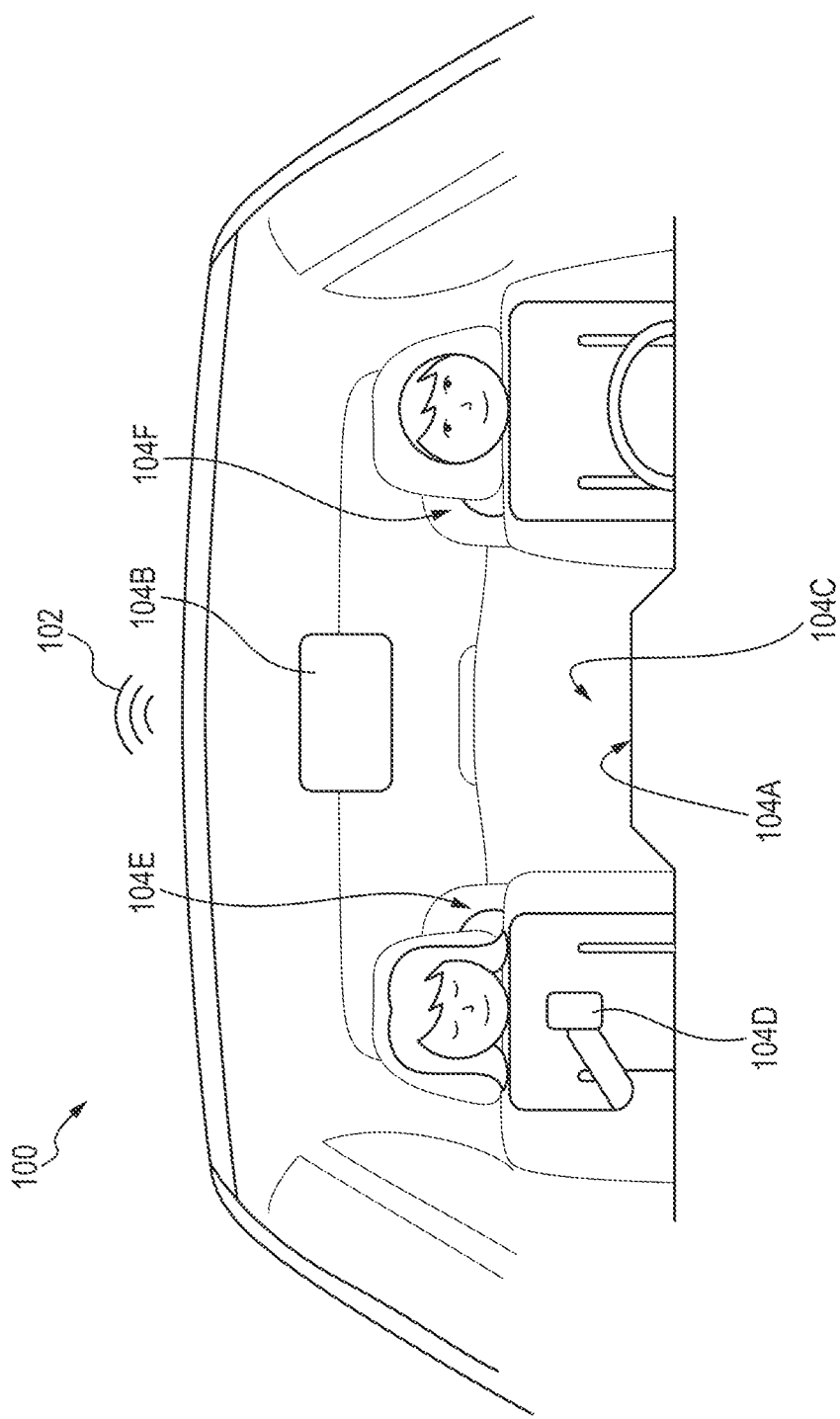
FIG. 1 is an exemplary vehicle illustrating connected devices to a vehicle area network in accordance with one aspect of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

System Overview

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure provides data and connectivity management systems and methods thereof that may be implemented on a vehicle or remote system. A router application and/or service endpoint resolver in communication with a telematics control unit (TCU) may support devices and enable content, video or music streaming. In an illustrative embodiment, the router application and/or service endpoint resolver may receive a data access request through a resource identifier. A data plan associated with the vehicle may be accessed. In turn, a determination may be made on whether the resource identifier is within a preset list of resource identifiers defined by the data plan. The request to the resource identifier may be processed when the resource identifier is within the preset list of resource identifiers defined by the data plan. When no data plan exists for the vehicle or the resource identifier is not in the preset list, denial of the request may be made.

The present disclosure describes a system and method that allows an improvement to the technology regarding data connectivity between vehicles, one or more portable devices that are wirelessly communicating with the vehicles, and/or one or more wireless carriers to allow selective access to one or more executable applications, web-based platforms, websites, and/or various data. The system enables efficient access management of application data, web-based data, and/or additional types of electronic data that is managed by OEMs of the vehicles and/or third-parties that are associated with the OEMs of the vehicles. As discussed below, the system allows for the monitoring and controlling of incoming and outgoing network traffic from the vehicles and/or one or more portable devices that are wirelessly communicating with the vehicles based on predetermined security rules that may be managed by the OEM(s), one or more third parties associated with the OEM(s), and/or one or more wireless carriers.

Numerous other modifications or configurations to the data and connectivity management systems and methods thereof will become apparent from the description provided below. For example, the router application and service endpoint resolver may be used in combination to manage data access associated with applications, URLs, web based utilities, and the like. The preset list may be synchronized with the router application through the service endpoint resolver. Advantageously, a more robust design is provided that allows data access services at a cost reduction. Unnecessary communications may also be removed. Other advantages will become apparent from the description provided below.

Turning to FIG. 1, an exemplary vehicle 100 illustrating connected devices 104A, 104B, 104C, 104D, 104E and 104F (singularly device 104 or collectively devices 104) to a vehicle area network (VAN) 102 in accordance with one aspect of the present disclosure is provided. The VAN 102 may be connected into by the devices 104 wirelessly or through a wireline. The VAN 102 may be in communication with one or more corresponding devices 104. When wireless, the VAN 102 may be network compliant with an industry standard IEEE 802.11 network, i.e., a Wi-Fi network, or network compliant with industry standard IEEE 802.16, i.e., a WiMAX network, or Bluetooth network, or any other suitable wireless network.

The VAN 102 may act as a gateway between a cellular network. The cellular network may use a Global System for Mobile Communications/General Packet Radio Service (GSM/GPRS) link; a Universal Mobile Telecommunications System (UMTS) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link. The cellular network may in turn be connected to the Internet or any other network such as an intranet or another WAN, via a gateway.

The VAN 102 may also communicate with the Internet or other network through infrastructure within the vehicle's surroundings. Vehicle to infrastructure (V2I), vehicle to vehicle (V2V), vehicle to cloud (V2C), vehicle to pedestrian (V2P), vehicle to everything (V2X) may also be used to connect to the Internet.

The devices 104 in the vehicle 100 may be any processor based device having a wireless or wireline transceiver capable of receiving and transmitting data via the VAN 102 or serial line. In one example, the devices 104 may be a laptop (or notebook) computer equipped with a wireless network interface card, a wireless-enabled personal digital assistant, a pocket or palmtop computer, a Wi-Fi phone (e.g., a Skype phone or VoIP phone), a Wi-Fi appliance, a gaming console or some other portable, network-enabled gaming station, a video screen, a digital camera, an audio player, a navigation device, a security camera, an alarm device, a wireless payment or point of sale device, or an automotive electronic device.

A head unit 104A may be connected into the vehicle 100 through a serial line. This may be a wireline connection. The head unit 104A may provide infotainment, such as Internet radio streaming, live data (traffic, parking, and weather), on-board navigation systems, etc. Diagnostic information may also be displayed on the head unit 104A. This data or information may be taken directly off the vehicle 100.

Store and forward techniques may be implemented. In one example, the head unit 104A may take in information through a download sequence and store that information into the vehicle 100. This information may be stored in memory locally. The information may also be stored remotely such as in a cloud structure or system. Through these features, the head unit 104A may provide in-car content and service applications.

The vehicle 100 may include other devices 104 that may use the serial line. A rear entertainment system 104B, one such device, may be tied to the head unit 104A. Controls may be displayed on the head unit 104A which directs or actuates functions on the rear entertainment system 104B. In an illustrative example, the rear entertainment system 104B may include a DVD/CD player, high definition multimedia interface (HDMI) for an external plugged in source (e.g., gaming systems, video cameras, etc.), live streaming, as well as OnDemand content. Mirroring may occur from the head unit 104A to the rear entertainment system 104B, in one example.

The other devices within the vehicle 100 may include, driver devices 104A, 104B and passenger devices (portable devices) 104D, 104E and 104F, each of which may communicate with the VAN 102. In one embodiment, the driver device 104C may be connected to the head unit 104A, for example, through tethering. The driver device 104C may be differentiated from the portable devices 104D, 104E and 104F. For example, content or data may be limited to the driver device 104C to remove driver distraction concerns. The portable devices 104D, 104E and 104F may be connected within the VAN 102 wirelessly, or through individual ports within the vehicle 100 that may establish wireline connections. These connections may be through the serial line instead of the VAN 102.

A session between the devices 104 and the Internet may be implemented by connecting with the VAN 102 or serial line. The connection may use a TCP (Transmission Control Protocol) transport protocol. TCP is a core protocol of the Internet protocol suite, often simply referred to as "TCP/IP." Using TCP, applications on networked hosts may create connections to one another, over which they may exchange streams of data using stream sockets. Stream sockets may be a type of internet socket which provides a connection-oriented, sequenced, and unduplicated flow of data without record boundaries. The TCP protocol may provide reliable and in-order delivery of data from sender to receiver.

When a device 104 seeks to establish the TCP session with the VAN 102 or through the serial line to connect to the Internet, or other network, the TCP session may be established through a router application and/or service endpoint resolver. All end-user traffic between the devices 104 and the destination may be routed through the router application and/or service endpoint resolver.

The devices 104 may communicate with a remote server or endpoint through the VAN 102 or serial line. The remote server may operate through a web server that may have software or hardware dedicated to running applications to satisfy client requests received from the World Wide Web (WWW). On the hardware side, the web server may store a website's component files, for example HTML documents, images, CSS stylesheets, and JavaScript files. The web server may be connected to the Internet and support physical data interchanges with other devices connected to the Web.

On the software side, a web server may include several parts that control how web users may access hosted files. A Hyper Text Transfer Protocol (HTTP) server is a piece of software that understands uniform resource locators (URLs), i.e. web addresses, and HTTP (protocol that is used to view webpages). The web server may be accessed through the domain names of websites it stores, and may deliver its content to the end-user's devices 104.

In one illustrative example, when a browser makes a request for a file which is hosted on the web server, the browser may use HTTP. When the request reaches the correct web server (hardware), the HTTP server (software) may accept the request depending on permissions or authorizations. The HTTP server may locate the requested document and may send the document back to the browser, also through HTTP. If the document is not located, a 404 response may be returned.

The server running may include one or more processors and memory. The main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used.

The devices 104 within the vehicle 100 may be used to receive content. In one example, accessible resource identifiers, such as URLs, may be used to access or retrieve content. When a browser makes a request for a file which is hosted on the web server, the browser uses HTTP. When the request reaches the correct web server (hardware), the HTTP server (software) may accept the request depending on permissions or authorizations. The HTTP server may locate the requested document and may send the document back to the browser, also through HTTP. If the document is not located, a 404 response may be returned.

A data access request through the resource identifiers may be made through the device, which may be then communicated through the VAN 102 or serial line and ultimately to the destination, that is, the web server. The router application and/or service endpoint resolver may monitor and adjust which sites may be accessed, with further description provided below. In unlimited plans, there is a certain amount of requests that may be made. After that request, traffic may be slowed down by a third party billing service.

Figure 2:
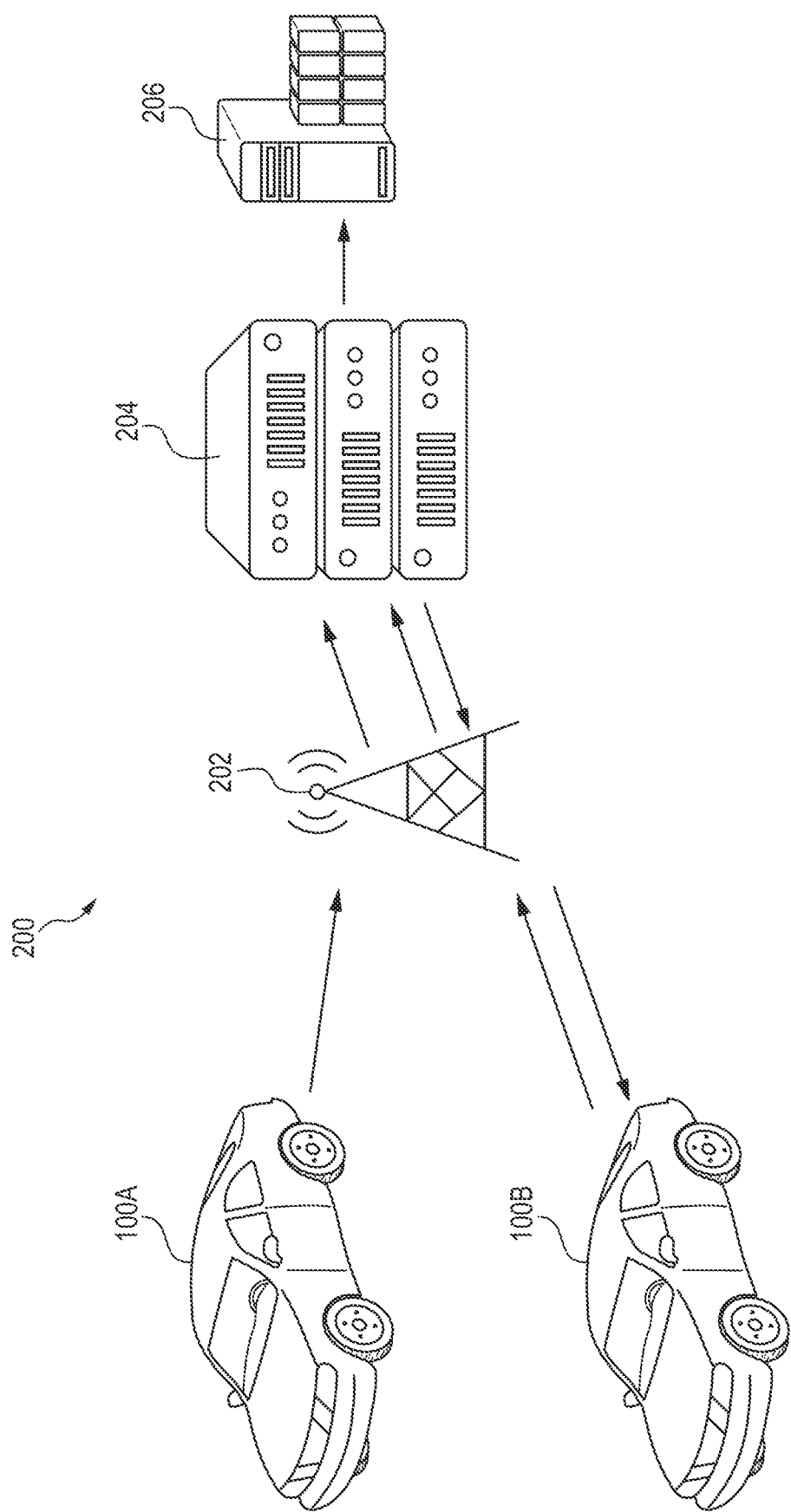
FIG. 2 is an exemplary environment of a third party billing service resolving data access requests in accordance with one aspect of the present disclosure.

FIG. 2 is an exemplary environment 200 of a third party billing service 204 resolving data access requests in accordance with one aspect of the present disclosure. A first vehicle 100A and second vehicle 100B (collectively vehicles 100 or singularly vehicle 100) will be described in relation to the third party billing service 204. Each vehicle 100 may request for data access through an accessible resource identifier, such as a URL.

The vehicles 100 may be distinguished by having an active data plan or no plan. The plan may be part of a free trial period or a paid subscription. Typically, free trial periods may last for six (6) months to one (1) year from the date of sale of the vehicle 100. By having a data plan, features and functions within the vehicle 100 may be implemented. Features may include, but are not limited to, remote engine start, access to a tire pressure management system, find car feature, send points-of-interest, fuel gauge, concierge service, remote lock/unlock, emergency service notifications, stolen vehicle tracking, remote diagnostics, streaming entertainment, and hotspot. Furthermore, requests through resource identifiers may be permitted or given access to.

For these features, the vehicles 100 may include a TCU to communicate with other servers. The TCU may communicate through a network 202. Network towers may be positioned at certain intervals and communicate with the vehicles 100 through radio waves. These towers may include a local antenna and a base station. A coverage area in which service is provided is divided into a mosaic of small geographical areas called cells, each served by a separate low power multichannel transceiver and antenna at a base station. The towers may handle cellular communications. Alternatively, the towers may be more of a widespread infrastructure for other types of communications.

The third party resolver billing service 204 may be connected through a network or networks with the network 202. For example, a combination of a local area network (LAN), a wide area network (WAN), a public switched telephone network (PSTN), or a satellite network, may be used such that the vehicles 100 may send and receive data to and from the third party resolver billing service 204.

The third party resolver billing service 204 may operate on a server. The server may include one or more processors and memory. The main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used. The third party resolver billing service 204 may communicate with the endpoint 206 through the network 202, which is not shown.

In operation, as shown in the environment 200, a first vehicle 100A may have an active data plan with the third party resolver billing service 204. A data access request may be provided to the third party resolver billing service 204 through the network 202 or a series of networks. At the third party resolver billing service 204, the account for the vehicle 100A may be verified. After verification, the request may be sent to the endpoint 206. A wireless connection may then be setup between the endpoint 206 and the vehicle 100A. This wireless connection may support devices and may enable video or music streaming of content. Typically, this may occur through a resource identifier such as a URL.

However, and when no data plan exists as shown in the second vehicle 100B, a data access request may be denied by the third party resolver billing service 204. The service 204, which stores information about vehicles 100 and their access privileges, may perform a lookup and not be able to locate any plan associated with the vehicle 1006. In one embodiment, and after finding that no data plan exists, the third party resolver billing service 204 may return a billing page to the vehicle 100B to potentially sign them up for services.

In the environment 200, the third party resolver billing service 204 may control the payment and data access. Simply, the service 204 may determine whether a data plan exists and passes or denies the data access request from the vehicles 100. Data and connectivity management systems may be more efficient than that described above. In particular, costs may be reduced by allowing a limited number of URLs and further, communications may be limited to locally performed processes.

Figure 3:
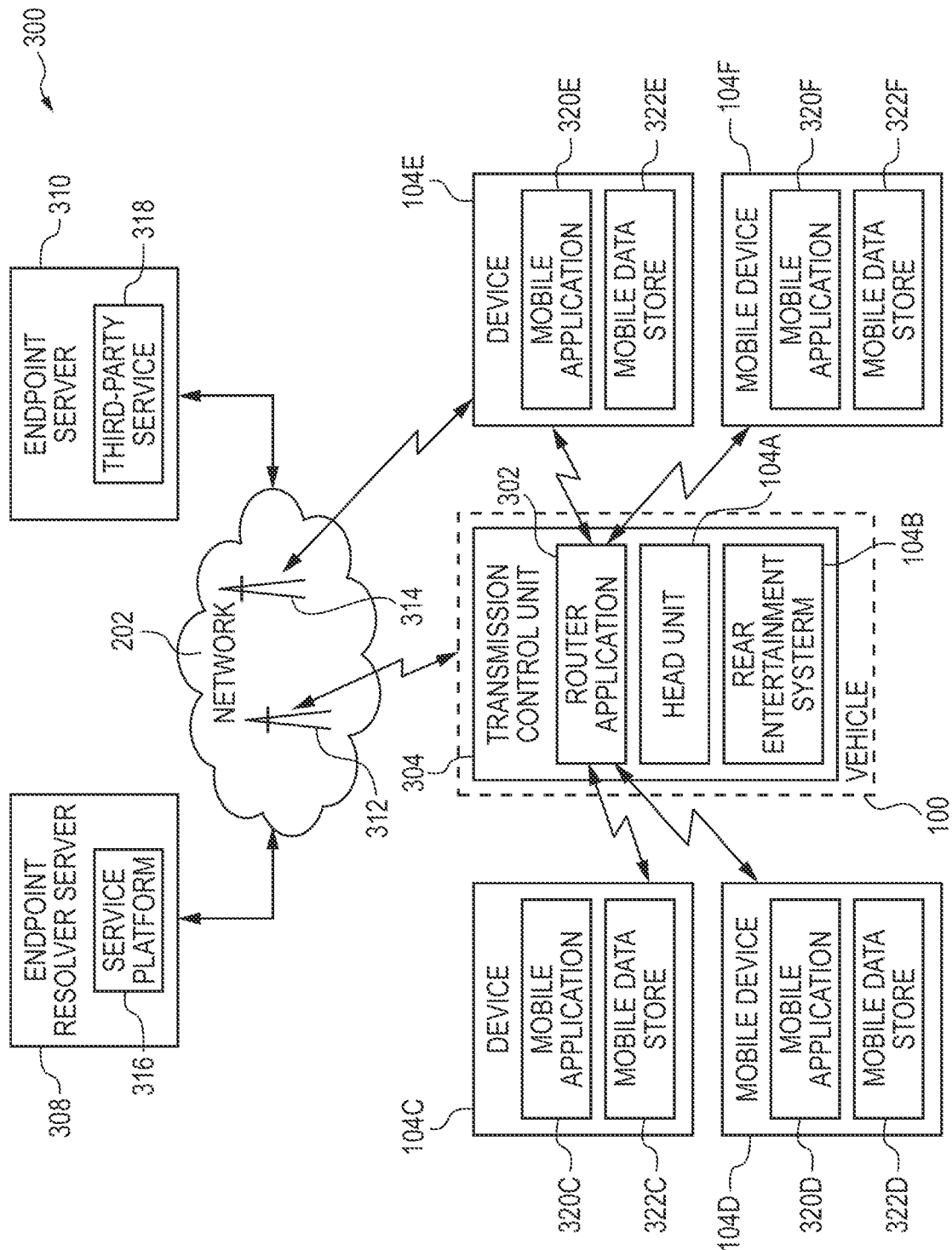
FIG. 3 is an exemplary environment illustrating components for resolving access to a resource identifier in accordance with one aspect of the present disclosure.

The previous system did not use a router application and/or service endpoint resolver. Rather, it was a simple check whether the vehicle 100 had a data plan or not. FIG. 3 is an exemplary environment 300 illustrating components for resolving access to a resource identifier in accordance with one aspect of the present disclosure. Through the disclosed environment 300, data transmissions may be lowered and further a reduced data plan may be implemented. Requests may also be handled locally.

The exemplary environment 300 may include a vehicle 100, having a router application 302 and TCU 304, connected to the network 202, with the network 202 communicatively coupled to an endpoint resolver server 308 and endpoint server 310. Each of the components within the vehicle 100 may be coupled to the network 202. The network 202 may include or take the form of one or more wired and/or wireless networks. The network 202 may include one or more wide area networks such as the Internet or a portion thereof, one or more cellular networks, one or more telephone networks, various intermediate networking devices, and edge devices such as wireless and/or wired access points 312 and 314.

Wireless access points 312 and 314 may support the same or different wireless communications protocols. In one illustrative example, wireless access points 312 and 314 may each support communications over wide-area cellular network protocols. As another example, wireless access point 314 may support communications over a local-area network using the Wi-Fi protocol, while wireless access point 312 may support communications over a wide-area cellular network.

The endpoint resolver server 308 may process data access requests from the vehicle 100. These requests may come in the form of resource identifiers such as URLs. The endpoint resolver server 308 may include a host service platform 316. This platform may include one or more servers that are co-located and/or geographically distributed. The service platform 316 may support a programming interface through which other computing devices and/or software modules (e.g., application programs or portions thereof) may obtain information, post information, access information, initiate or receive commands, and/or communicate with.

The service platform 316 of the endpoint resolver server 308 may include an account database. The database may include information regarding data plans of active/inactive users. Furthermore, the database may include a preset list of resource identifiers for each user or account holder. This preset list may otherwise be known as a whitelist. In operation, and when a request is made to the endpoint resolver server 308, the database on the service platform 316 may be accessed. The server 308 may check whether an account exists. If a resource identifier is received, and the requesting party has an account with data access, the resource identifier is checked against the preset list. Access may be permitted when the resource identifier is within the list.

The endpoint resolver server 308 may handle the data access requests from the vehicle 100. Alternatively, the endpoint resolver server 308 may act like a conduit for storing information regarding user accounts as well as accessible resource identifiers associated with those accounts. The server 308 may be used by users to adjust their accounts as well as the resource identifiers.

In one embodiment, the vehicle 100 may have functions or features similar to the endpoint resolver server 308, that is, the router application 302 on the vehicle. The router application 302 may take over incoming and outgoing data requests and transmission from other applications. Interactions may be managed through this takeover. Requests may be handled locally on the vehicle 100. To reduce the cost associated with a data plan, a reduced amount of URLs which may be accessed is provided. In this way, the cost is reduced significantly by the network provider who operates the service platform 316 within the endpoint receiver server 308. In the vehicle 100, the router application 302 may be an access manager. The access manager may provide access for applications, data and web services, those of which are within a specified set of URLs. In one embodiment, the access manager may be used to provide a centralized single sign-on and single sign-out for applications, servers, and data.

The router application 302 may be within the vehicle 100 or on a personal mobile device. The application 302 may take in requests. From there, the application 302 may determine whether the particular vehicle 202 has data access, that is, has a data plan. The vehicle 100 may then check the requested URL with those stored in a whitelist on the vehicle 100 itself.

The whitelist of URLs are typically stored on the router application 302, or on the service platform 316 of the endpoint resolver server 308. The URLs may be changed, sometimes accompanied with a change fee. In one example, the data plan may allow for unlimited access to five (5) URLs. A change in URLs may cost an additional fee such as a change from one music streaming application to another. Fewer or more URLs may be accessed depending on the time of day. For example, different plans may exist on the weekend versus weekday. Times of the day may also affect how many URLs may be accessed.

Dynamic management of URLs may allow a user to keep track of which URLs are available under their specific plan. The user may choose a music streaming application, a weather application, or the like for their five (5) URLs. If the vehicle 100 is requesting access to a site that is not within their allotted plan, the dynamic management system may suggest a similar site that is within their user allotted plan. As will be shown, this feature may take place on the router application 302, the endpoint receiver server 308, or a combination of them.

The vehicle 100 may communicate with the network 202 through the TCU 304. The TCU 304 may interface with vehicle on-board diagnostic (OBD) systems, human operable client devices such as mobile and non-mobile computing devices 104, a service platform typically hosted at one or more network accessible servers, and various third-party services also typically hosted at one or more network accessible servers.

The TCU 304 may be connected to the cellular network as described above. Through the connection, the devices 104 may be enabled with content, video or music streaming. The tethered head unit 104A and the rear entertainment system 104B may receive this information through the serial line.

The portable devices 104C, 104D, 104E, and 104F may connect wirelessly with the TCU 304. Each of the portable devices 104C, 104D, 104E, and 104F may include a mobile application program 320C, 320D, 320E and 320F (singularly mobile application program 320 or collectively mobile application programs 320) and a mobile data store 322C, 322D, 322E and 322F (singularly mobile data store 322 or collectively mobile data stores 322).

In one example, the mobile application program 320 may take the form of a general-purpose application program such as a web browser. The web browser may have been included with the device 104 at the time of purchase or may form part of an operating system of the mobile computing device. In this context, a user may operate the web browser to navigate to any accessible network resource, including websites of the world-wide-web, service platform 316, and third-party services 318.

In another example, the mobile application program 320 may take the form of a special-purpose application program that is paired with and/or configured specifically for use with the TCU 304, service platform 316, and/or any suitable number of third-party services 318. In such case, the special-purpose application program may not have been included with the device 104 at the time of purchase. Typically, special-purpose application programs may be subsequently downloaded from an application program marketplace or network resource hosted at service platform 316, third-party service 318, or other suitable network location over communications network 202, after which the application program may be installed and executed at a computing device. A service-enabled computing device may be refer to a general-purpose computing device upon which a special-purpose application program operates that is paired with and/or configured specifically for use with one or more of a TCU or a network service such as service platform 316 and/or third-party service 318, for example.

The mobile data stores 322 on the devices 104 may include two types of storage, for example. Internal storage and external storage may be used. On most devices 104, internal storage is smaller than external storage. However, internal storage is always available on all devices, making it a more reliable place to put data on which your app depends. In one example, the data stores 322 may include photos and videos, application data, etc.

Figure 4:
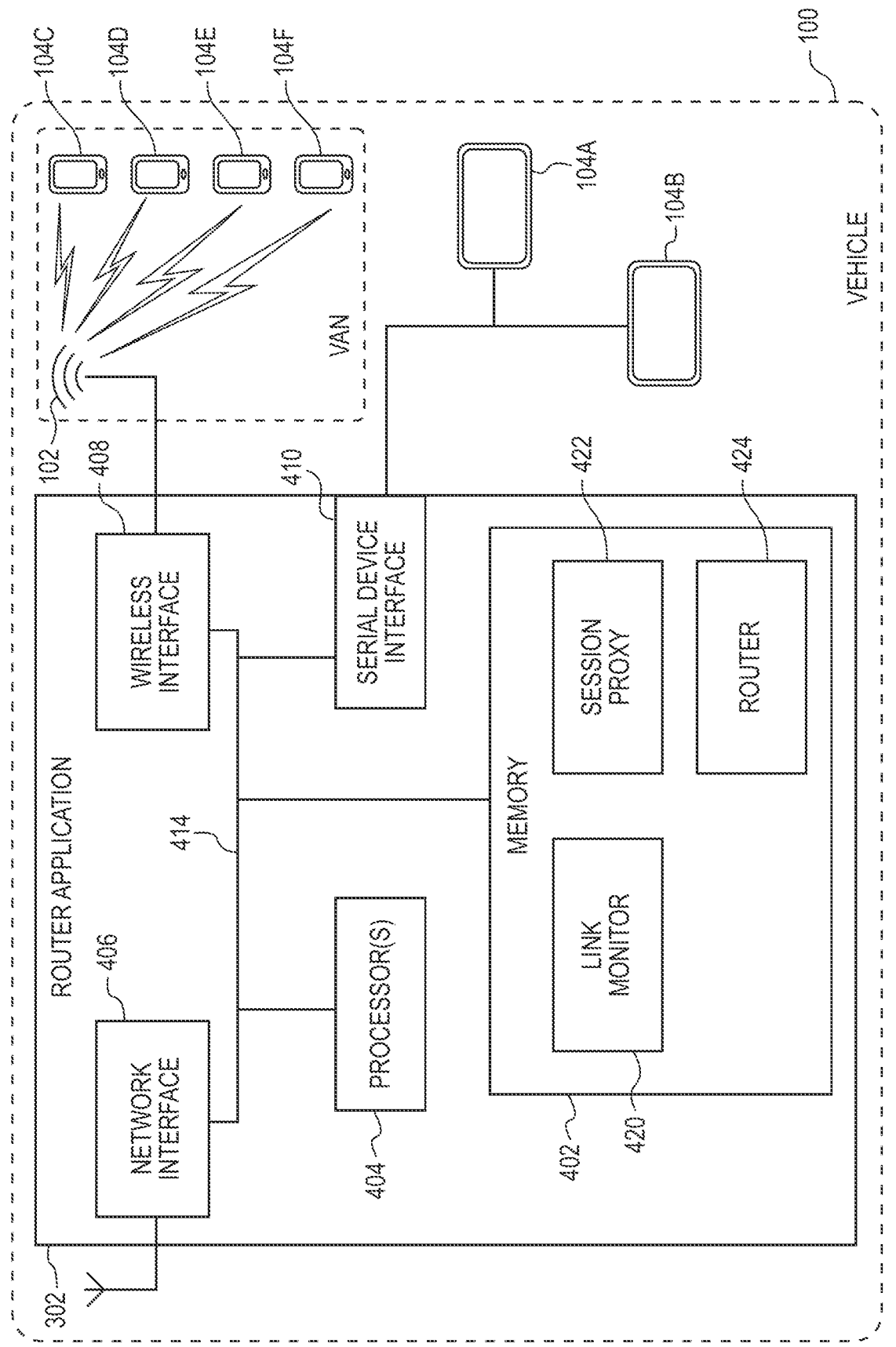
FIG. 4 is an exemplary router application on a vehicle side illustrating components to interface with devices in accordance with one aspect of the present disclosure.

As shown above, the router application 302 may be entirely set on the vehicle 100 itself. FIG. 4 is an exemplary router application 302 on a vehicle side illustrating components to interface with devices in accordance with one aspect of the present disclosure. The router application 302 may include memory 402, at least one processor 404, network interface 406, wireless interface 408, and serial device interface 410. Fewer or more component may be provided within the router application 302.

The processor 404 may execute various programs or instruction code stored in memory 402. The memory 402 may include one or more types of computer-readable media. As such, the memory 402 may include one or more memory chips, optical memory devices, magnetic memory devices, or other memory devices.

Various programs or program modules are executable by the processor 404. The program modules may include a link monitor 420, session proxy 422, and a router 424. These components may be stored in portions of memory 402 or in one or move separate memories. The router 424 may be executed by the processor 404 to route data packets between a wireless network and/or cellular network, as described above. The data packets may be distributed to the devices 104. The link monitor 420 may monitor cellular communication links and also Internet communication links via the cellular network by sending test or probing data packets and monitoring for responses thereto. By monitoring the sending and receiving of test packets and responses, the processor 404 may execute the link monitor 420 if the cellular communication link or Internet link fails.

The network interface 406 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

The wireless interface 408 may connect with and provide the VAN 102 with a wireless local area network. Similarly, the interface 408 may communicate with one or more types of wireless network links such as a Wi-Fi, WiMAX, or Bluetooth link. This may communicate with the portable devices 104C, 104D, 104E, and 104F.

The serial device interface 410 may communicate with the head unit 104A and the rear entertainment system 104B to receive and transmit data packets. The serial devices may communicate with the router 424 using any suitable serial data protocol, including the USB (Universal Serial Bus) standard, the RS-232 standard, the RS-485 standard, or the IEEE 1394 (FireWire) standard, for example.

The processor 404, by executing the session proxy 422, acts as a session proxy for all TCP sessions going through the VAN 102 and the serial device interface 410 outside of the vehicle 100. When a device 104 seeks to establish a TCP session with a destination such as a third party server coupled to the Internet, a TCP session is established via the router 424 with the destination. The device 104 may also may maintain a separate TCP session when not using the router 424.

The router application 302 may include a vehicle network bus 414 that typically utilizes a standardized protocol over which data or commands may be communicated with various sensors, nodes, processors and other vehicular apparatus coupled to the vehicle network bus. The bus 414 may be a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

The vehicle network bus 414 may provide access to the various vehicle electronic control modules in the vehicle. Some of the typical electronic modules on current vehicles are the Engine Control Unit (ECU), the Transmission Control Unit (TCU), the Anti-lock Braking System (ABS) and body control modules (BCM).

Figure 5:
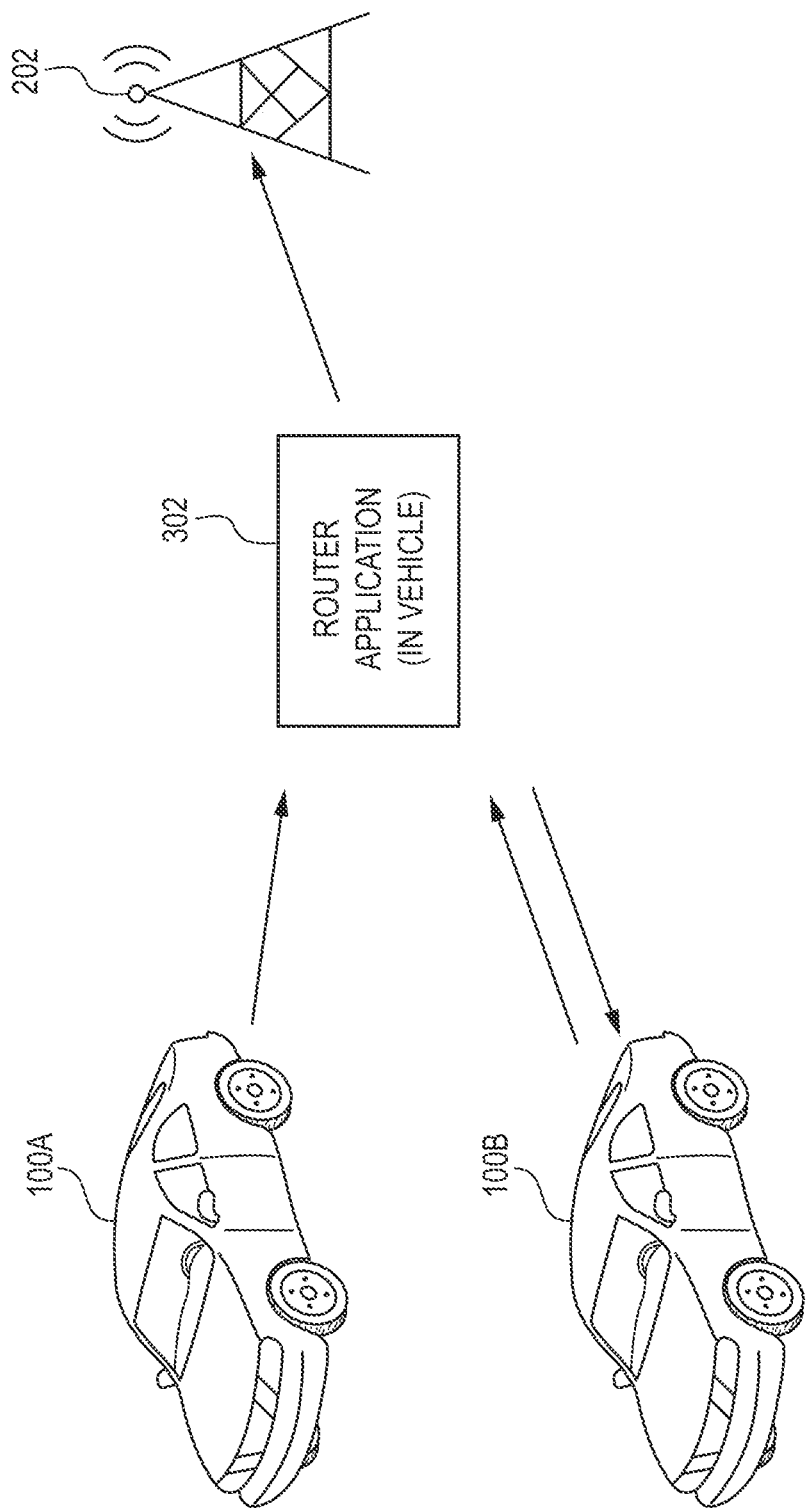
FIG. 5 is an exemplary system illustrating the router application on the vehicle side to process data access requests in accordance with one aspect of the present disclosure.

Multiple embodiments were described above having a router application and/or service endpoint resolver. The processing of the accessible resource identifiers, for example URLs, may occur on the vehicle, through the service endpoint resolver, or a combination of both. FIG. 5 is an exemplary router application 302 on a vehicle side to process data access requests in accordance with one aspect of the present disclosure. Similar to before, the vehicles 100A and 100B may either have an active data plan or no plan. Before communicating to the network 202 through their TCUs, the vehicles 100 may determine whether they have access locally through the router application 302. Thus, billing issues may be resolved on the vehicle side.

Multiple advantages may be realized through the router application 302 being placed on the vehicle 100. Advantageously, less network traffic occurs by reducing connections that may otherwise occur. That is, instead of having the TCU do the work, requests are handled locally.

To reduce the cost associated with a data plan, a reduced amount of URLs which may be accessed is provided. In this way, the cost is reduced significantly by the network provider who only operates a whitelist of URLs. In the vehicle 100, the router application 302 may be an access manager. The access manager may provide access for applications, data and web services, those of which are within a specified set of URLs. In one embodiment, the access manager may be used to provide a centralized single sign-on and single sign-out for applications, servers, and data.

The router application 302 may be within the vehicle 100 or on a personal mobile device. The application 302 may take in requests, that is, data access requests. From there, the application 302 may determine whether the particular vehicle 100 has data access through a data plan. The vehicle 100 may then check the requested URL with those stored in a whitelist on the vehicle itself.

The whitelist of URLs are typically stored on the router application 302. The URLs may be changed, sometimes accompanied with a change fee. In one example, the data plan may allow for unlimited access to five (5) URLs. A change in URLs may cost an additional fee such as a change from one music streaming application to another. Fewer or more URLs may be accessed depending on the time of day. For example, different plans may exist on the weekend versus weekday. Times of the day may also affect how many URLs may be accessed.

Dynamic management of URLs may allow a user to keep track of which URLs are available under their specific plan. The user may choose a music streaming application, a weather application, or the like for their five (5) URLs. If the vehicle 100 is requesting access to a site that is not within their allotted plan, the dynamic management system may suggest a similar site that is within user allotted plan.

When a denial of data access is provided, the web page that the user should be redirected to after the logout may be identified using a redirection URL. The router application 302 may append the redirection URL as a value of a parameter, such as "end URL," to the logout URL. Once the router application 302 performs the logout, the user is redirected to this "end URL". That is, the user may be redirected to a location pointed to by the end URL. In one example, this may be redirected to a site for upgraded services. In one embodiment, firmware updates may be used to update billing information and whitelists on the vehicle 100. This may be performed through over-the-air (OTA) updates. The updates may be distributed over the network 202.

The router application 302 may also provide a human machine interface (HMI). That is, the application 302 may provide a user interface where a number of different options may be provided and selected. For example, the user may be presented with a number of different billing options that relate to how many accessible resource identifiers may be requested. Five (5), ten (10), and fifteen (15) URLs may be activated for use by the vehicle 100 depending on the plan selected by the user within the vehicle's HMI.

Figure 6:
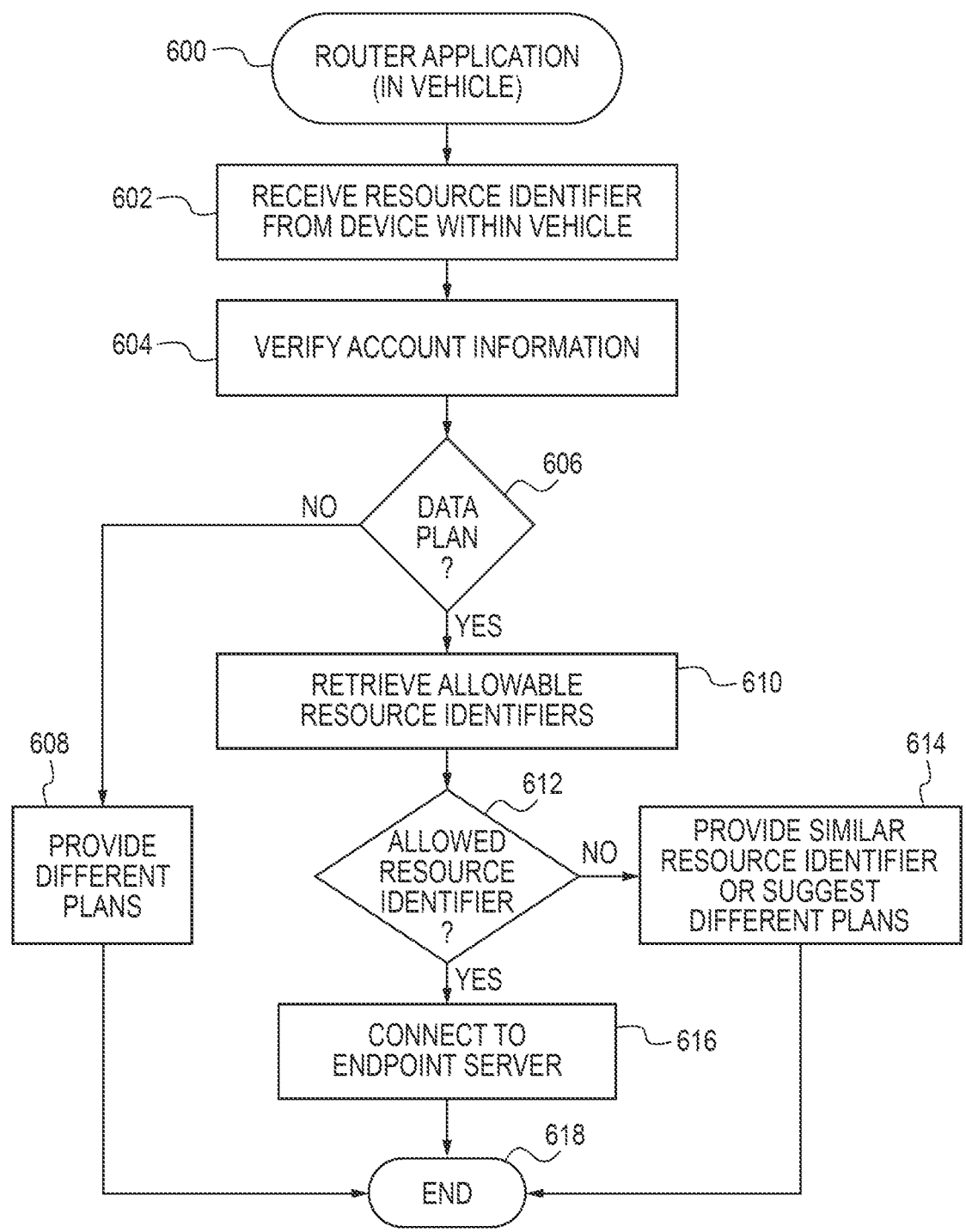
FIG. 6 is an illustrative flowchart showing processes for implementing the router application on the vehicle side in accordance with one aspect of the present disclosure.

FIG. 6 is an illustrative flowchart showing processes for implementing the router application on the vehicle side in accordance with one aspect of the present disclosure. These processes are for illustrative purposes and should not be construed as limiting. The processes may begin at block 600. The processes are from the perspective of the router application within the vehicle.

At block 602, the router application may receive a resource identifier from a device within the vehicle. This may be accessed through one of the driver devices and/or portable devices. These devices may access the resource identifier through their browsers. The data request may also be received from one of the serial devices such as the head unit 104A or rear entertainment system 104B. The resource identifier may be able to access content, video or music streaming, for example.

On the vehicle, the user's account may be verified at block 604. This occurs on the vehicle for this embodiment. The account information may be downloaded through the TCU and stored within memory on the vehicle. At decision block 606, a determination may be made on whether a data plan exist. The data plan, in one example, is related to the vehicle and not the individual users on the vehicle.

In one alternative implementation, the users on the vehicle may have their own data plans. This may be particularly useful for ride sharing services, or non-owned vehicles, where the user would access their own data plan. The non-vehicle owners would not use the vehicle's data plan. Rather, the user would access their own. The whitelist of URLs may be established within their device's memory.

If there is no data plan for the vehicle, at block 608, the vehicle through the HMI on the router application may suggest or provide access plans. In an illustrative example, an unlimited access plan may be presented with purchasing options. Credit card and automated payment screens may be provided. Limited access plans, such as the one described above, may also be provided. Through this limited access, five (5) URLs may be queried by the devices within the vehicle. The processes may end at block 618.

When a data plan exists for the vehicle, at block 610, the vehicle retrieves allowable resource identifiers. The list of allowable resource identifiers may be downloaded through the TCU through an OTA update. The identifiers may be specific for this vehicle and may be downloaded through vehicle identification information such as a vehicle identification number (VIN).

At decision block 612, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

At block 614, and when the resource identifier is not within one of the approved resource identifiers as defined by the user's plan, the vehicle may provide a similar resource identifier or suggest different plans to expand the amount of URLs that they may access. In one example, one streaming service may be substituted for one that is within the accessible list. Other substitutions may include one social networking service for another that is within the whitelist. If multiple URLs are owned by a parent company, access may still be provided. The processes may end at block 618.

If the resource identifier is within the whitelist and is accessible by the vehicle, as deemed by the restricted access plan, the device within the vehicle may be connected to the endpoint server that is hosting the URL at block 616. The device within the vehicle may connect through the router application, and then through the vehicle's TCU to the endpoint server. The communication between the vehicle's TCU may go through the network to receive and transmit data to and from the endpoint server. The processes may end at block 618.

Figure 7:
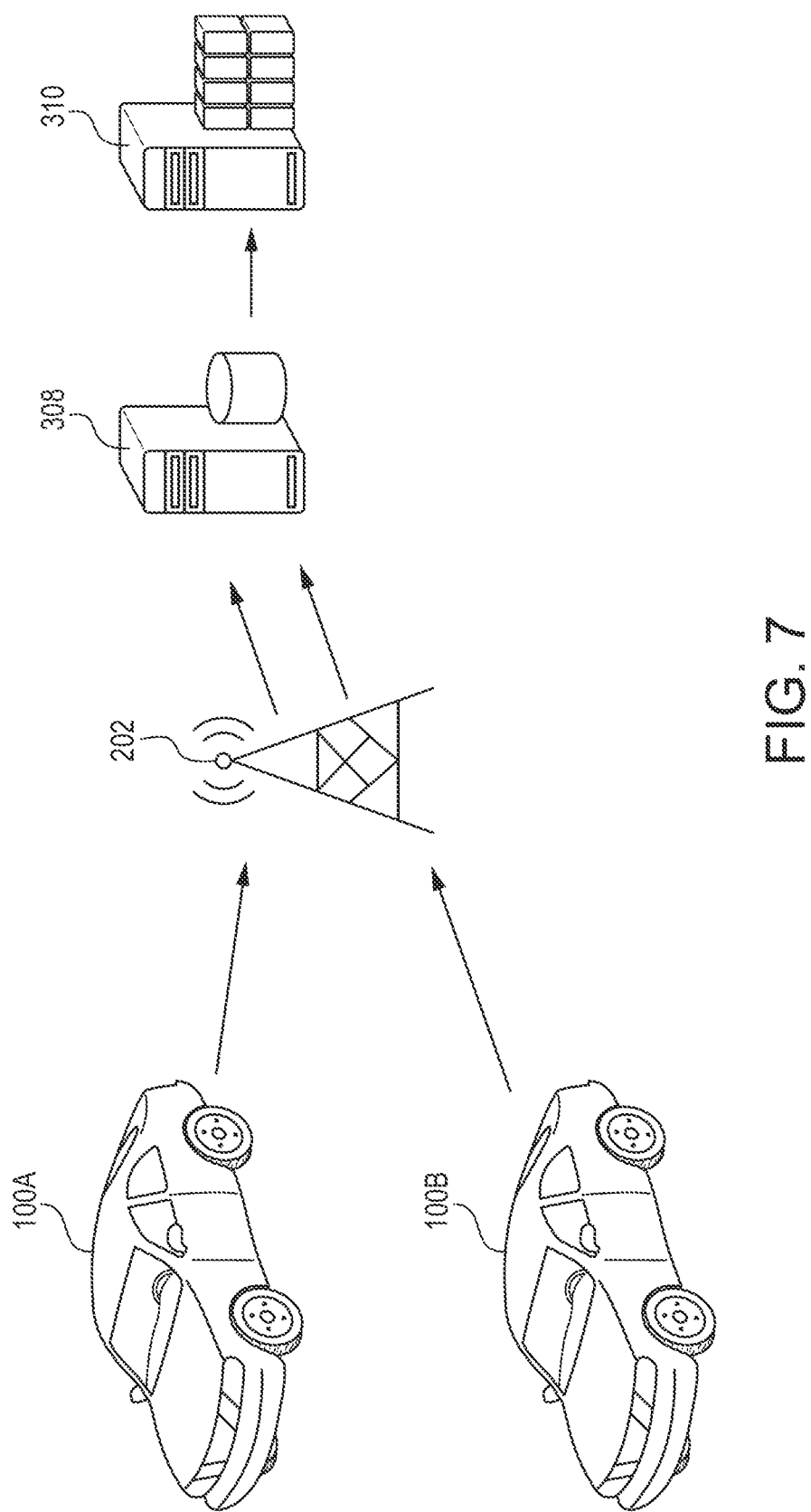
FIG. 7 is an exemplary endpoint resolver server handling data access requests in accordance with one aspect of the present disclosure.

Previously, the vehicle had a router application that handled the requests. Turning to FIG. 7, an exemplary endpoint resolver server 308 handling data access requests in accordance with one aspect of the present disclosure is provided. The vehicles 100A and 100B may communicate with the network 202. Communications from the vehicle 100A with the data plan and the vehicle 100B without the data plan may be provided to the network 202 through the TCU of each vehicle 100. In this implementation, there is no router application on the vehicle 100.

Communicatively coupled to the network 202 may be the service endpoint resolver 308. The service endpoint resolver 308 may perform similar functions and features as the router application within the vehicle described above. The resolver 308 may take the form of a server. The resolver 308 may determine if the vehicle is authorized to reach the endpoint server 310 and if it has an active plan. The service endpoint resolver 308 may maintain a list of accessible resource identifiers, such as URLs, and status of active data plans. The resolver 308 may be based on a cloud computing structure. Billing plans, similar to those described above, may be implemented.

In one embodiment, the accessible resource identifiers may be changed through the service endpoint resolver 308. This may occur through an HMI on the vehicle 100 and transmitted up through its TCU to the resolver 308. Fees may be assessed when a change occurs to the accessible URLs. This information may be stored along with the data plan of the vehicle 100.

Once approved, as having a data plan and accessible URLs, the vehicle 100A may send a data access request to the endpoint 310 through the service endpoint resolver 308. The resolver 308 make communicate with the endpoint 310 through the network as defined above. Identifier information (billing) may be sent with the communication. If the data access request was not authorized on the billing plan, a denied message may be sent back to the vehicle 100B. That is, if no data plan exists or the requested URL is not within the data plan, denial of access to the request may be given.

Figure 8:
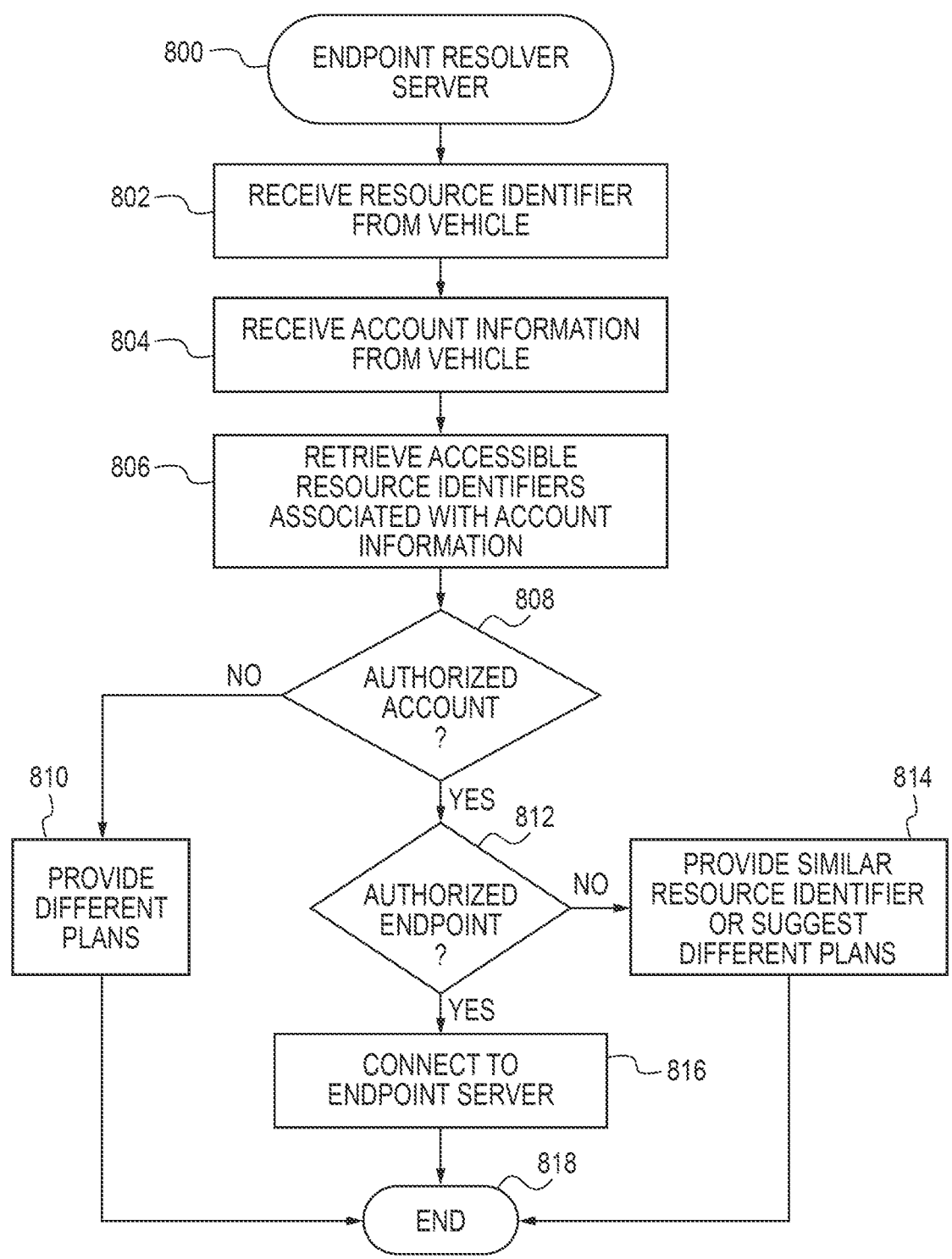
FIG. 8 is an illustrative flowchart showing processes for the endpoint resolver server in accordance with one aspect of the present disclosure.

FIG. 8 is an illustrative flowchart showing processes for the endpoint resolver server in accordance with one aspect of the present disclosure. These processes are for illustrative purposes and should not be construed as limiting. The processes may begin at block 800. The processes are from the perspective of the endpoint resolver server.

At block 802, the endpoint resolver server may receive a resource identifier from the vehicle. The vehicle may retrieve this identifier from one of the devices on the vehicle. These devices may access the resource identifier through their browsers. The data request may also be received from one of the serial devices such as the head unit 104A or rear entertainment system 104B. The resource identifier may be able to access content, video or music streaming, for example. This information may be transmitted through the TCU of the vehicle up to the network, and finally to the endpoint resolver server.

Account information regarding the particular vehicle may be received at block 804. The account information may be stored on the endpoint resolver server. Vehicle identifying information may be sent with the resource identifier request. This information may be matched or compared with accounts stored on the endpoint resolver server. At block 806, and using the account information for the particular vehicle, the endpoint resolver server may retrieve the accessible resource identifiers associated with the account information. The vehicle may have an unlimited or restricted plan. The unlimited plan may provide access to all resource identifiers, while the restricted plan may have a restricted amount, for example, five (5) URLs.

At decision block 808, a determination is made whether the vehicle has an authorized account for data request. This determination is made on the endpoint resolver server. The endpoint resolver server, at block 810, may provide different plan options if a valid account does not exist for the vehicle or associated with the user. In an illustrative example, an unlimited access plan may be presented with purchasing options. Credit card and automated payment screens may be provided. Limited access plans, such as the one suggested above, may be provided. Through this limited access, five (5) URLs may be accessed by the devices within the vehicle. The processes may end at block 818.

If the vehicle has an authorized account, at decision block 812, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

At block 814, and when the resource identifier is not within one of the approved resource identifiers as defined by the user's plan, the vehicle may provide a similar resource identifier or suggest different plans. In one example, one streaming service may be substitute for one that is within the accessible list. Other substitutions may include one social networking service for another. If multiple URLs are owned by a parent company, access may still be provided. The processes may end at block 818.

In one alternative implementation, the users on the vehicle may have their own data plans. This may be particularly useful for ride sharing or non-owned vehicle services where the user would access their own data plan. Through this, the vehicle owner would not have to allow access to their own plan to support data access request. Rather, the user would access their own data plan and thus, their own resource identifiers.

Figure 9:
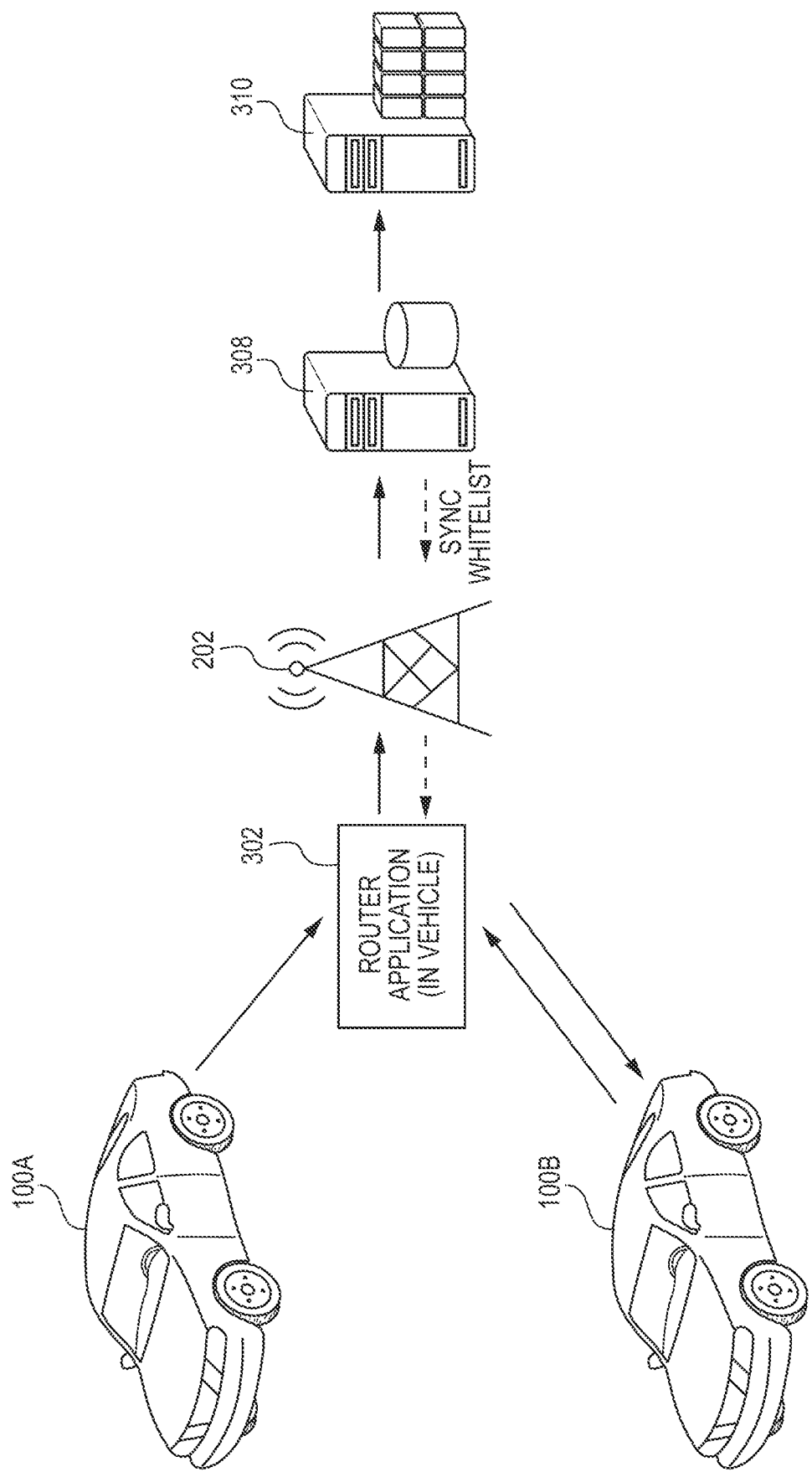
FIG. 9 is an exemplary combination of the router application and service endpoint resolver for handling data access requests in accordance with one aspect of the present disclosure.

Referring to FIG. 9, a combination of the exemplary router application 302 and service endpoint resolver 308 for handling data access requests in accordance with one aspect of the present disclosure is provided. In this environment, the router application 302 may be periodically synchronized with an approved whitelist for the vehicle 100A which is received from the service endpoint resolver 308. Advantageously, this may allow for data cost savings at the vehicle level.

The router application 302 on the vehicle 100 may determine if the vehicle 100 is authorized to reach the endpoint 310 and if it has an active data plan. Data plans may be checked on the router application 302. In the illustrative example, the first vehicle 100A may have a data plan and the second vehicle 100B may have no data plan.

The router application 302 may handle locally the human machine interface to communicate to the user that their requested data path is not allowed. In one embodiment, the interface may guide them to use the approved list according to their plan or upsell them to a plan which has more access capabilities. The router application 302 may check whether the vehicle 100 has a valid account and whether the accessed resourced identifier by the device within the vehicle 100 are within the stored whitelist before communicating with the network 202.

The service endpoint resolver 308 may maintain a global list of allowable URLs and status of active vehicle plans. The resolver 308 may be based on a cloud computing structure. Billing plans, similar to those described above, may also be stored on the service endpoint resolver 308. The service endpoint resolver 308 may update the router application 302 on the vehicle 100 through OTA updates via the TCU on the vehicle 100. Other methods for updating the router application may be used, for example, through infrastructure communications.

The service endpoint resolver 308 may act as a remote storage facility for the router application 302. The whitelist of accessible resource identifiers may be stored on the service endpoint resolver 308 and may be synchronized with the router application 302. This may occur periodically, for example, every day, week, or month. The data stored on the service endpoint resolver 308 may have priority status. In other words, the information on the service endpoint resolver 308 may be the master which may not be changed, unless proper authorization is given. This authorization may be given through proper password credentials or other verification methods.

Information on the service endpoint resolver 308 may be updated or modified by other computing devices that may be tied into the network 202 through properly authorized access. They may change the data access or whitelist of accessible URLs. In one example, those who may change it are not the users. Rather, personnel who work with the service endpoint resolver 308 may modify it.

In one embodiment, if the vehicle 402 is requesting access to a site that is not within their allotted plan, it may suggest one that is within their allotted plan. For example, Pandora may be used instead of Spotify. Thus, a dynamic adjustment of URLs may be made. If multiple URLs are owned by a parent company, access may still be provided.

Figure 10:
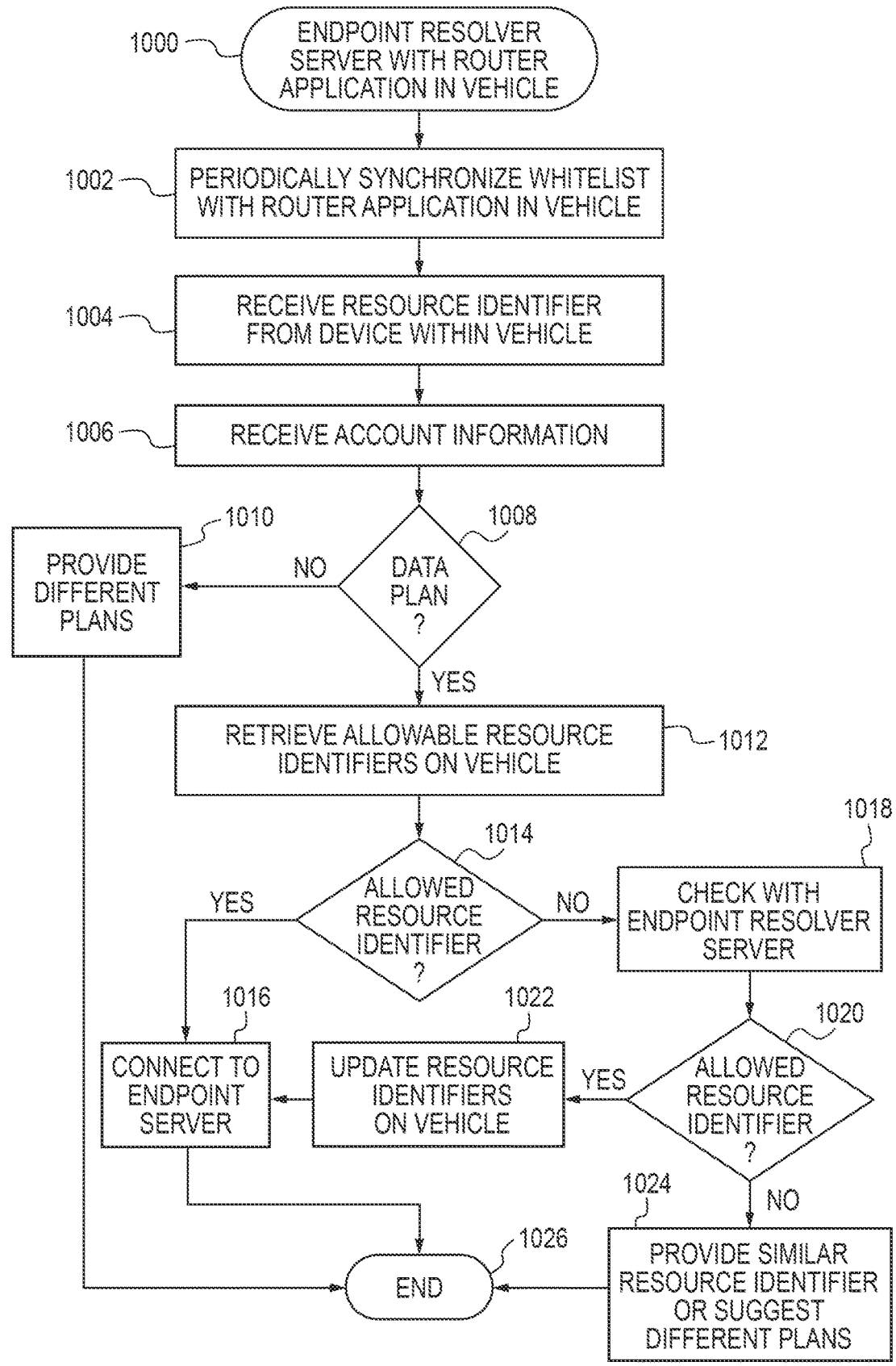
FIG. 10 is an illustrative flowchart showing processes for the exemplary router application and service endpoint resolver in accordance with one aspect of the present disclosure.

FIG. 10 is an illustrative flowchart showing processes for the exemplary router application and service endpoint resolver in accordance with one aspect of the present disclosure. These processes are for illustrative purposes and should not be construed as limiting. The processes may begin at block 1000. The processes are from the perspective of the router application on the vehicle.

At block 1002, the router application may be periodically synchronized. This may include receiving an updated whitelist from the service endpoint resolver. In one embodiment, each time the whitelist is updated on the service endpoint resolver, the router application on the vehicle may be automatically updated. Alternatively, or in combination, the router application may be updated every day, week or month with the accessible resource identifiers in the whitelist.

In addition, account information regarding the specific vehicle may be updated. For example, when an account expires, this information may be synchronized with the service endpoint resolver. This may remove information on the router application on the vehicle. Prior information about the account and whitelist may also be removed if the account expires.

At block 1004, the router application on the vehicle may receive a resource identifier from a device within the vehicle. This may be accessed through one of the driver devices and/or portable devices. These devices may access the resource identifier through their browsers. The data request may also be received from one of the serial devices such as the head unit 104A or rear entertainment system 104B. Through the resource identifier, access to content, video or music streaming may be provided.

At block 1006, account information for the vehicle may be received. This information may be located on the vehicle. The data plan associated with the vehicle may also be retrieved. At decision block 1008, a determination may be made on whether a data plan exists. The data plan, in one example, is related to the vehicle and not the individual users on the vehicle.

At block 1010, the router application may provide different plan options if a valid account does not exist for the vehicle. In an illustrative example, an unlimited access plan may be presented with purchasing options. Credit card and automated payment screens may be provided. Limited access plans, such as the one suggested above, may be provided. Through this limited access, five (5) URLs may be accessed by the devices within the vehicle. Further increases on the number of accessible URLs would correspond to an increase in cost. The processes may end at block 1026.

When a data plan exists for the vehicle, at block 1012, the vehicle retrieves allowable resource identifiers on its local memory. As mentioned earlier, these may be periodically synchronized with the service endpoint resolver. The identifiers may be specific for this vehicle and may be identified through its vehicle identification number (VIN). The identifiers may be retrieved off local memory.

At decision block 1014, a determination is made whether the retrieved resource identifier is one of the identifiers within the vehicle's plan. This may be achieved through comparing or matching the received resource identifier from the device with those retrieved and stored within memory on the vehicle. The accessible resource identifiers may be stored in a whitelist.

If the resource identifier is within the whitelist and is accessible by the vehicle, as deemed by the restricted access plan, the device within the vehicle may be connected to the endpoint server that is hosting the URL at block 1016. The device within the vehicle may connect through the router application, and then through the vehicle's TCU to the endpoint server. The communication between the vehicle's TCU may go through the network to receive and transmit data to and from the endpoint server. The processes may end at block 1026.

If the resource identifier is not within the whitelist, at block 1018, the router application may in one embodiment check with the endpoint resolver server to determine whether it is a valid accessible resource identifier. At decision block 1020, a determination is made whether the requested resource identifier is within a whitelist that is associated with the vehicle's account on the endpoint resolver server.

When the resource identifier was not found on the endpoint resolver server, at block 1024, the router application or service endpoint resolver may suggest a similar site that is within the vehicle's allotted plan. In one example, one streaming service may be substituted for one that is within the accessible list. Other substitutions may include one social networking service for another. If multiple URLs are owned by a parent company, access may still be provided. The processes may end at block 1026.

Otherwise, and when the resource identifier is found within the endpoint resolver server, the whitelist may be updated at block 1022 within the router application of the vehicle.

If the resource identifier is within the whitelist and is accessible by the vehicle, as deemed by the restricted access plan, the device within the vehicle may be connected to the endpoint server that is hosting the URL at block 1016. The device within the vehicle 100 may connect through the router application 302, and then through the vehicle's TCU to the endpoint server. The communication between the vehicle's TCU may go through the network to receive and transmit data to and from the endpoint server. The processes may end at block 1026.

Figure 11:
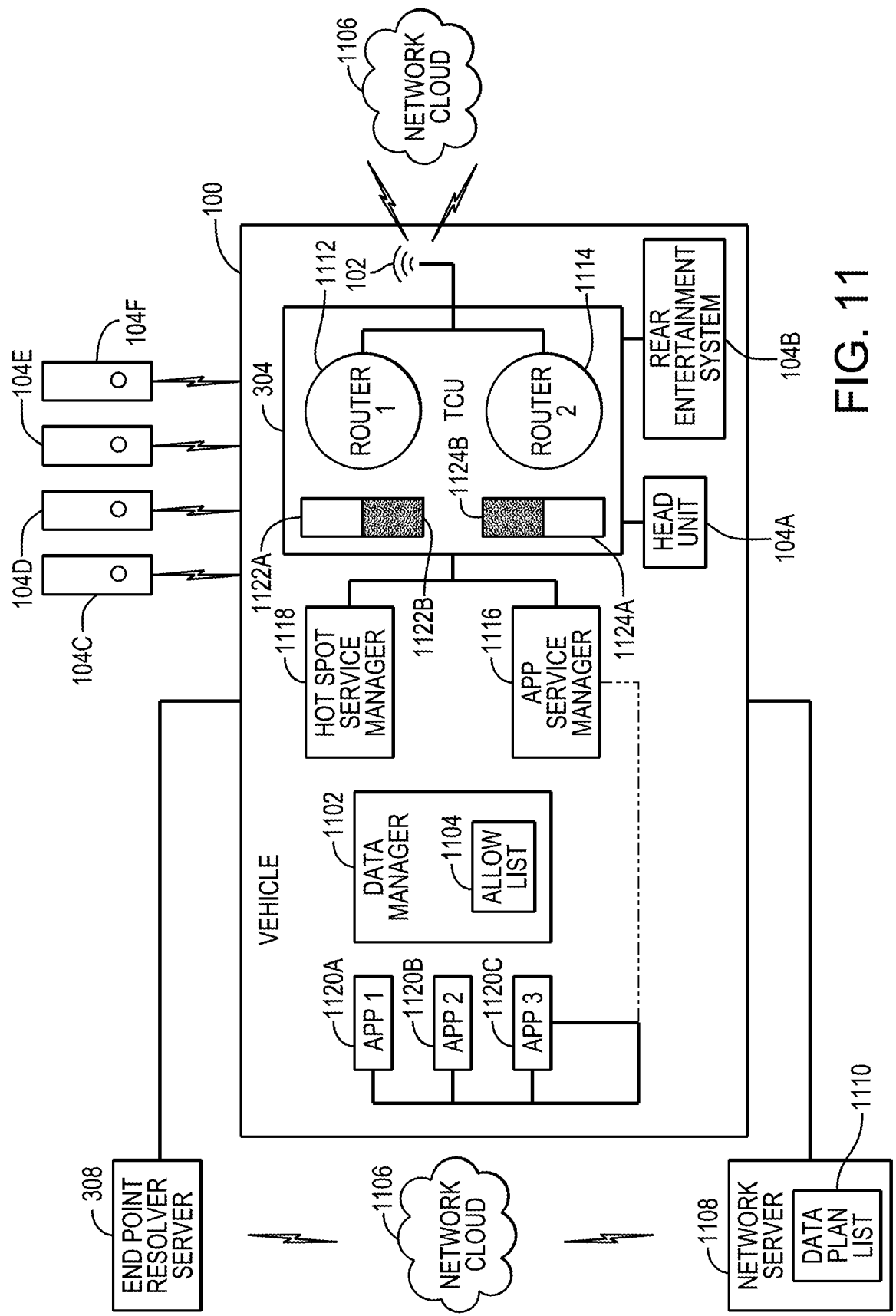
FIG. 11 is a schematic overview of an exemplary embodiment of an application data and connectivity management system that may be implemented on the vehicle or a remote system according to an exemplary embodiment of the present disclosure.

FIG. 11 is a schematic overview of an exemplary embodiment of an application data and connectivity management system that may be implemented on the vehicle 100 or a remote system according to an exemplary embodiment of the present disclosure. As shown, the vehicle 100 includes a data manager 1102 that is configured to manage data communications to and/or from the vehicle 100. For example, the data manager 1102 may manage data that is received and/or sent through the wireless access points 312 and 314 with respect to communications over the VAN 102 and/or the wide-area cellular network. The router application 302 may take over incoming and outgoing data requests and transmission from other applications. Interactions may be managed through this takeover. Requests may be handled locally on the vehicle 100 through the data manager 1102.

In an exemplary embodiment, the data manager 1102 may include a storage device, output devices, input devices, and peripheral devices (not shown). A singular bus between the components may be used for one or more data transport functions. In one configuration, the storage device may store an allow list 1104. The allow list 1104 may be configured to include a list of application names, associated IP addresses, and associated permissions to allow access to one or more vehicle applications, applets, application interfaces, portable applications, application web interfaces, and the like.

In one embodiment, the allow list 1104 may be updated based on a data plan that is associated with the vehicle 100. The data plan may be provided at different price points to provide access to one or more applications, one or more types of applications (e.g., categories of application: social media, entertainment, finance), and/or one or more application data bandwidth service levels that may be associated with one or more applications, data utilized by one or more applications, amount of data downloaded and/or uploaded by one or more applications, and the like. In this way, the cost is reduced significantly by the wireless data provider who as the router application 302 acts as an access manager. The access manager may provide access for applications, data and web services, those of which are within a specified list of applications or a set of URLs that are included within the allow list 1104 and/or the whitelist.

In one configuration, the allow list 1104 may be updated based on a particular data plan that may be selected. For example, a user (e.g., driver of the vehicle 100) may select and purchase a particular data plan that may allow access to five particular applications. Accordingly, the type, price point, and/or level of data plan that may be purchased by the user may dictate the applications that are included within the allow list 1104 and may thereby be accessed through the VAN 102 from the vehicle 100.

In an exemplary embodiment, the data manager 1102 may utilize the TCU 302 to connect to the VAN 102 to connect to a network cloud 1106. This functionality enables the VAN 102 to act as a gateway between a cellular network (network cloud 1106) and the vehicle 100. Stated differently, a session between the devices 104 and the Internet may be implemented by connecting with the VAN 102.

Through the network cloud 1106, the TCU 304 may be utilized to wirelessly communicate with a network server 1108. The network server 1108 may be owned, operated, and/or managed by one or more wireless data providers. For example, the network server 1108 may be owned, operated, and/or managed by a wireless provider that provides the data plan that is associated with the vehicle 100.

The network server 108 may include one or more processors and memory (not shown). A main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used.

In one embodiment, the main memory may store a data plan list. The data plan list may be associated with the vehicle 100 through one or more identifiers. The one or more identifiers may include, but may not be limited to, a vehicle identification number (VIN) of the vehicle 100, a media access control access (MAC address) assigned to routers 1112 and 1114 of the TCU 304, user credentials assigned to a driver or passenger of the vehicle 100, and the like.

Based on the data plan selected and purchased, the one or more wireless data providers may store the data plan list and may utilize a communication device (not shown) of the network server 1108 to communicate the data plan list directly to the TCU 304 of the vehicle 100 through the network cloud 1106 to be analyzed by the router application 302 to thereby update the allow list 1104 stored upon the data manager 1102. In another embodiment, the one or more wireless data providers may utilize the communication device of the network server 1108 to communicate the data plan list to the end point resolver server 308.

In one embodiment, the end point resolver server 308 may be owned, operated, and/or managed by the OEM of the vehicle 100 and/or one or more third-parties that are associated with the OEM of the vehicle 100. In one configuration, the endpoint resolver server 308 may process data access requests from the vehicle 100. These requests may come in the form of resource identifiers that may be associated with applications. As discussed above, the endpoint resolver server 308 may include a host service platform 316. This platform may include one or more servers that are co-located and/or geographically distributed. The service platform 316 may support a programming interface through which other computing devices and/or software modules (e.g., application programs or portions thereof) may obtain information, post information, access information, initiate or receive commands, and/or communicate with.

The end point resolver server 308 may handle the data access requests from the vehicle 100 based on analysis of the data plan list received from the network server 1108 through the network cloud 1106. Alternatively, the endpoint resolver server 308 may act like a conduit for storing information regarding user accounts as well as accessible application identifiers associated with those accounts that may be associated with the data plan provided by one or more wireless data providers. The server 308 may be used by users to adjust their accounts as well as the resource identifiers.

In one embodiment, the TCU 304 may be utilized to communicate with the end point resolver server 308 to receive information regarding accessible application identifiers associated with those accounts that may be associated with the data plan provided by one or more wireless data providers. The accessible application identifiers may be associated with one or more particular applications that may be accessible through the data manager 1102. Upon receipt of the data from the end point resolver server 308 that is associated with application identifiers, the router application 302 may thereby update the allow list 1104 stored upon the data manager 1102 with a list of one or more applications that may be accessible through the data manager 1102 of the vehicle 100.

In one configuration, the data plan list may include a list of applications (URLs, IP addresses) that may be accessible through the data plan based on the type of data plan currently purchased. More particularly, based on the analysis of data communicated by the network server 1108 and/or the end point resolver server 308. The data plan list may also include a data plan tier that may identify the amount of data usage that is allowed based on the data plan. In some embodiments, the data plan list may include a block list that may be associated with applications (URLs, IP addresses) that may be blocked from being accessed through the data plan based on data provided by the network server 1108 and/or the end point resolver 308.

In an exemplary embodiment, the data manager 1102 may be operably connected to an app service manager 1116 and a hot spot service manager 1118. The app service manager 1116 may be configured to receive a resource identifier from a device 104 within the vehicle 100 such as the head unit 104A or rear entertainment system 104B. The resource identifier may be associated with one or more input requests to execute and access one or more respective applications 1120A, 11206, and/or 1120C from the head unit 104A or rear entertainment system 104B.

In one embodiment, upon the receipt of one or more input requests that may be provided by one or more users through a home user interface (e.g., application list interface) that may be presented through the head unit 104A or rear entertainment system 104B, the app service manager 1116 may be configured to access the data manager 1102 to analyze the allow list 1104 to determine if the applications 1120A, 1120B, and/or 1120C selected by the user are included within the allow list. In one embodiment, the router application 302 may be configured to utilize the app service manager 1116 to communicate data that pertains to one or more of the applications 1120A, 1120B, and/or 1120C being allowed or not allowed to one or more of the routers 1112, 1114 of the TCU 304 to thereby utilize associated router ports 1122A, 1124A, 11226, or 11246 accordingly.

With respect to the hot spot service manager 1118, the app service manager 1116 may be operably connected to the hot spot service manager 1118. In one embodiment, the hot spot service manager 1118 may be configured to provide a wireless hot spot service to allow wireless connectivity of one or more portable devices 104D, 104E, and 104F through the VAN 102. Stated differently, the hot spot service manager 1118 may enable the one or more portable devices 104D, 104E, and/or 104F to be wirelessly tethered to the vehicle 100 to allow the one or more portable devices 104D, 104E, and/or 104F to utilize the VAN 102 to wirelessly connect to the network cloud 1106 to utilize one or more applications 1120A, 11206, and/or 1120C, URLs, and/or additional web-based services.

In an exemplary embodiment, the hot spot service manager 1118 may be operably connected to the app service manager 1116. In one configuration, during a hot spot connection between one or more portable devices 104D, 104E, and 104F and the vehicle 100 through the hot spot service manager 1118, the hot spot service manager 1118 may communicate with the app service manager 1116 to enable the user to execute and/or utilize one or more applications through the one or more portable devices 104D, 104E, and 104F connected to the vehicle 100 through a wireless hot spot connection.

In particular, the hot spot service manager 1118 may communicate with the app service manager 1116 to communicate a respective resource identifier that is received from one or more portable devices 104D, 104E, and 104F. The resource identifier may be associated with one or more input requests to execute and access one or more respective applications 1120A, 11206, and/or 1120C through the one or more portable devices 104D, 104E, and 104F that are wirelessly connected to the vehicle 100 to access the VAN 102 through the hot spot connection.

In one embodiment, upon the receipt of one or more input requests that may be provided by one or more users through a home user interface (e.g., application list interface) that may be presented through the one or more portable devices 104D, 104E, and 104F, the app service manager 1116 may be configured to access the data manager 1102 to analyze the allow list 1104 to determine if the applications 1120A, 1120B, and/or 1120C selected by the user are included within the allow list. As discussed below, the router application 302 may be configured to utilize the app service manager 1116 to communicate data that pertains to one or more of the applications 1120A, 1120B, and/or 1120C being allowed or not allowed to one or more of the routers 1112, 1114 of the TCU 304 to thereby utilize associated router ports 1122A, 1124A, 11226, or 11246 accordingly.

As discussed above, the TCU 304 may include a plurality of routers 1112, 1114. In the configuration shown in FIG. 11, the TCU 304 includes a first router 1112 and a second router 1114. However, it is appreciated that the TCU 304 may include more than two routers that perform unique and/or shared functions. In one embodiment, the first router 1112 may be configured to send and receive application data, web-based data, operating system data, vehicle infotainment data and the like through the VAN 102. In particular, applications, websites/URLs, operating systems, and/or vehicle infotainment interfaces and/or utilities and the like that may be presented through the head unit 104A or rear entertainment system 104B may be provided based on data that is communicated through the first router 1112 of the TCU 304. Additionally, applications, websites/URLs, operating systems, and/or vehicle infotainment interfaces and/or utilities and the like that may be presented through the one or more portable devices 104D, 104E, and 104F that are connected to the vehicle 100 through a hot spot connection provided through the hot spot service manager 1118 may be provided based on data that is communicated through the first router 1112 of the TCU 304.

In one embodiment, the second router 1114 may be configured to send vehicle based data through the VAN 102. In particular, vehicle based data such as GPS sensor data, vehicle software updates, vehicle firmware updates, vehicle dynamic sensor data, vehicle environmental sensor data, security system data, and the like may be communicated through the VAN 102 using the second router 1114. However, it is appreciated that the functionality of the first router 1112 and the second router 1114 are interchangeable in additional embodiments.

In one or more embodiments, the first and second routers 1112 and 1114 may be configured to include respective router ports 1122A, 1122B, 1124A, and 1124B. The router ports 1122A, 1122B, 1124A, and 1124B may be configured to communicate well known and commonly used protocols (e.g., TCP, UDP) to enable communication of data between the data manager 1102, the app service manager 1116, and the first and second routers 1112 and 1114 to send and receive data through the VAN 102 that acts as a gateway between the vehicle 100 and the cellular network of the wireless data provider(s).

In particular, with respect to the first router 1112, the router port 1122A may be configured as an allow port that may be assigned by the router application 302 to allow data to be communicated through the VAN 102 based on a determination that particular applications, URLs, and/or internet resources are included within the allow list 1104 and/or the whitelist. The router port 1122B may be configured as a block port that may be assigned by the router application 302 to disallow application data and thereby block such data to be communicated through the VAN 102 based on a determination that particular applications, URLs, and/or internet resources are not included within the allow list 1104 and/or the whitelist.

With respect to the second router 1114, the router port 1124A may be configured as an allow port that may be assigned by the router application 302 to allow data to be communicated through the VAN 102 based on a determination that particular applications, URLs, and/or internet resources are included within the allow list 1104 and/or the whitelist. The router port 11246 may be configured as a block port that may be assigned by the router application 302 to disallow data to be communicated through the VAN 102 based on a determination that particular applications, URLs, and/or internet resources are not included within the allow list 1104 and/or the whitelist.

In an exemplary embodiment, if the user attempts to utilize one or more of the applications 1120A, 1120B, and/or 1120C through the head unit 104A or rear entertainment system 104B of the vehicle 100 and/or through one or more portable devices 104D, 104E, and 104F that are connected to the vehicle 100 through a hot spot connection provided through the hot spot service manager 1118, the app service manager 1116 may be configured to access the data manager 1102 to analyze the allow list 1104 to determine if the applications 1120A, 1120B, and/or 1120C selected by the user are included within the allow list. As discussed above, the allow list 1104 may be stored upon the data manager 1102 and may be configured to include a list of application names, associated IP addresses, and associated permissions to allow access to one or more vehicle applications, applets, application interfaces, portable applications, application web interfaces, and the like.

In one embodiment, if the user attempts to utilize one or more of the applications 1120A, 1120B, and/or 1120C through the head unit 104A or rear entertainment system 1046 of the vehicle 100, the app service manager 1116 may access and analyze the allow list 1104 to determine if the one or more of the applications 1120A, 1120B, and/or 1120C is included within the allow list with permissions to allow access to the one or more vehicle applications. If it is determined that one or more of the applications 1120A, 1120B, and/or 1120C is included within the allow list 1104 with permissions to allow access to the one or more vehicle applications, the app service manager 1116 may be configured to communicate respective data to the TCU 304 of the vehicle 100 to activate an active port 1122A of the first router 1112 or an active port 1124A of the second router 1114 to communicate application related data to and/or from the TCU 304 through the VAN 102 accessible through the data plan based on the type of data plan currently purchased.

If the user attempts to utilize one or more of the applications 1120A, 1120B, and/or 1120C through one or more portable devices 104D, 104E, and 104F that are connected to the vehicle 100 through a hot spot connection provided through the hot spot service manager 1118, the hot spot service manager 1118 may communicate data pertaining to the one or more of the applications 1120A, 1120B, and/or 1120C that the user is attempting to utilize to the app service manager 1116.

The app service manager 1116 may thereby access and analyze the allow list 1104 to determine if the one or more of the applications 1120A, 1120B, and/or 1120C that is included within the allow list 1104 with permissions to allow access to the one or more vehicle applications. If it is determined that one or more of the applications 1120A, 1120B, and/or 1120C is included within the allow list 1104 with permissions to allow access to the one or more vehicle applications, the app service manager 1116 may be configured to communicate respective data to the TCU 304 of the vehicle 100 to activate an active port 1122A of the first router 1112 or an active port 1124A of the second router 1114 to communicate application related data to and/or from the TCU 304 through the VAN 102 accessible through the data plan based on the type of data plan currently purchased.

In one embodiment, upon analyzing the allow list 1104, if it is determined by the app service manager 1116 that one or more of the applications 1120A, 1120B, and/or 1120C are not included within the allow list 1104 to allow access to the one or more vehicle applications, the app service manager 1116 may be configured to communicate respective data to the TCU 304 of the vehicle 100 to activate a block port 11226 of the first router 1112 or a block port 11246 of the second router 1114 to disallow communication of application related data to and/or from the TCU 304 through the VAN 102.

In some embodiments, upon activation of the block port 1122B or the block port 1124B, the router application 302 may be configured to present a human machine interface through the head unit 104A and/or portable devices 104D, 104E and 104F. In particular, the application 304 may provide a user interface where a number of different options may be provided and selected. For example, the user may be presented with a number of different billing option suggestions that pertain to the upgrade of the currently subscribed data plan through the wireless data provider that may allow more applications and/or the selected applications 1120A, 1120B, and/or 1120C to be accessible through the cellular network via the VAN 102. If the user chooses to upgrade their data plan, the network server 1108 may be updated accordingly, and may thereby provide related data to the end point resolver server 308 and/or directly to the data manager 1102 to thereby update the allow list 1104 to enable access to the one or more requested applications.

Figure 12:
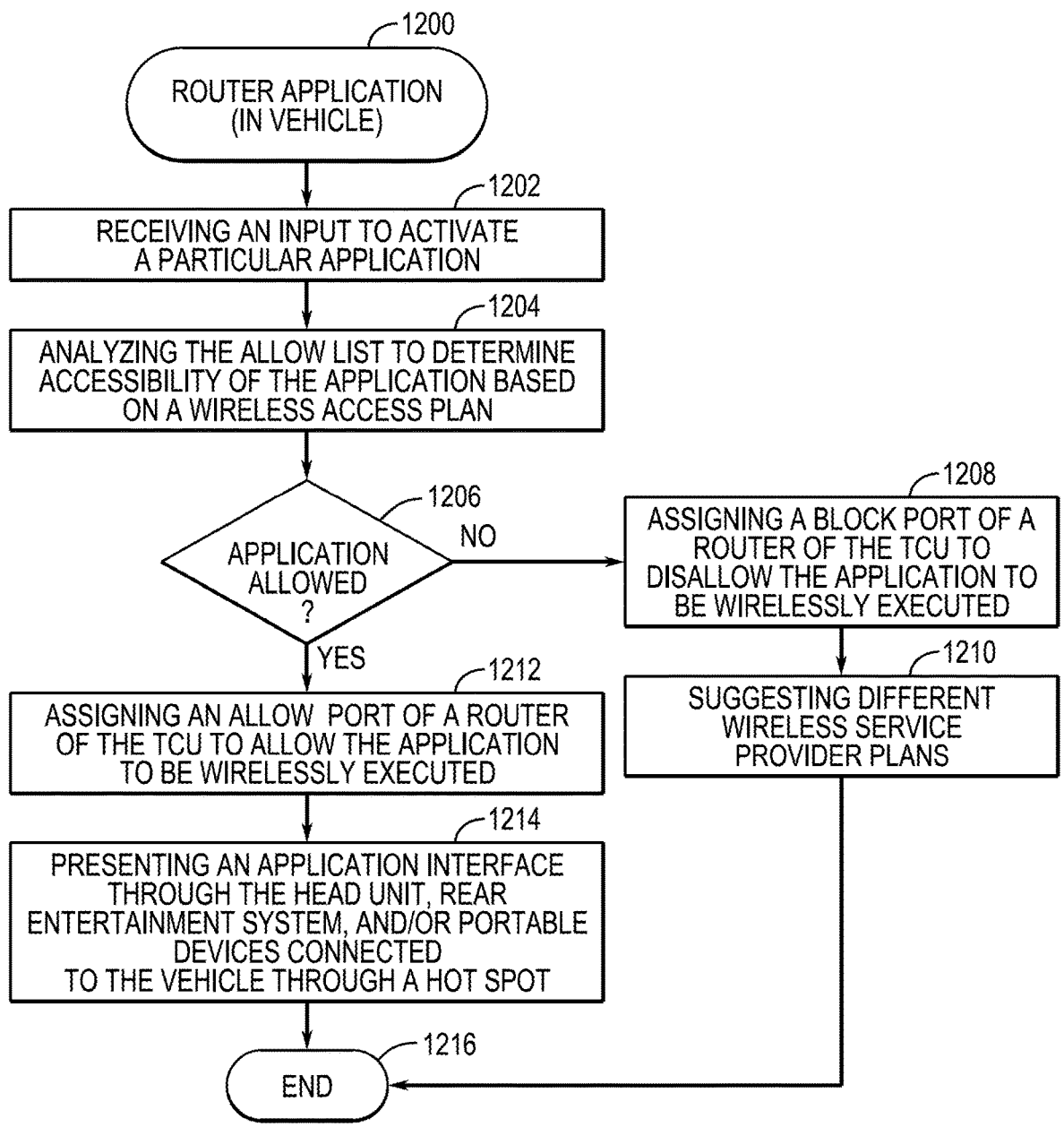
FIG. 12 is a process flow diagram of a method for assigning a router port to allow or disallow accessibility of an application based on an analysis of the allow list according to an exemplary embodiment of the present disclosure.

FIG. 12 is a process flow diagram of a method for assigning a router port 1122A, 1122B, 1124A, 1124C to allow or disallow accessibility of an application based on an analysis of the allow list 1104 according to an exemplary embodiment of the present disclosure. The method of FIG. 12 is for illustrative purposes and should not be construed as limiting. The method of FIG. 12 may begin at block 1200.

The processes are from the perspective of the router application 302 within the vehicle.

In one embodiment, the router application 302 may receive a resource identifier from a device 104 within the vehicle 100. This may be accessed through one of the driver devices and/or portable devices. These devices 104 may access the resource identifier through their browsers. The data request may also be received from one of the serial devices such as the head unit 104A or rear entertainment system 104B. The resource identifier may be able to access content, video or music streaming, for example.

The method may include block 1202, wherein the method may include receiving an input to activate a particular application. In an exemplary embodiment, a user using the head unit 104A or rear entertainment system 104B and/or one or more portable devices 104D, 104E, and 104F that are connected to the vehicle 100 through a hot spot connection provided through the hot spot service manager 1118 may provide an input to execute and utilize a particular application through a home user interface (e.g., application list interface).

The method may proceed to block 1204, wherein the method may include analyzing the allow list to determine accessibility of the application based on a wireless access plan. In one embodiment, upon receiving an input to execute a particular application, the app service manager 1116 may be configured to access the data manager 1102 to analyze the allow list 1104 to determine if the particular application inputted by the user is included within the allow list 1104 stored upon the data manager 1102 of the vehicle 100.

Upon analyzing the allow list 1104 to determine accessibility of the application based on the wireless access plan, the method may proceed to block 1206, wherein the method may include determining if the application is allowed. As discussed above, the allow list 1104 may be configured to include a list of application names, associated IP addresses, and associated permissions to allow access to one or more vehicle applications, applets, application interfaces, portable applications, application web interfaces, and the like. It is determined that the particular application inputted by the user is or is not referenced and/or included within the allow list 1104 to thereby determine if the application is allowed or not allowed.

In one embodiment, if it is determined that the particular application inputted by the user is not referenced and/or included within the allow list 1104, the router application 304 may determine that the particular application is not allowed based on the wireless data plan between the wireless data provider and the vehicle 100. Alternatively, if it is determined that the particular application is referenced and/or included within the allow list 1104, the router application 304 may determine that the particular application is allowed based on the wireless data plan between the wireless data provider and the vehicle 100.

If it determined that the application is not allowed (at block 1206), the method may proceed to block 1208, wherein the method may include assigning a block port 1122*b*, 1124*b* of a router 1112, 1114 of the TCU 304 to disallow the application to be wirelessly executed. As discussed above, the router ports 1122B and 11246 may be configured as block ports that may be assigned by the router application 302 to disallow data (e.g., block data) to be communicated through the VAN 102 based on a determination that particular applications, URLs, and/or internet resources are not included within the allow list 1104.

In one configuration, if it is determined by the app service manager 1116 that the particular application inputted by the user is not included within the allow list 1104, the app service manager 1116 may be configured to communicate respective data to the TCU 304 of the vehicle 100 to activate the block port 11226 of the first router 1112 or the block port 11246 of the second router 1114 to disallow communication of application related data to and/or from the TCU 304 through the VAN 102. In other words, the application is not included as being accessible through the data plan, data associated with the input to access and execute the application through the data plan is sent through the block port 1122B of the first router 1112 or the block port 1124B of the second router 1114 to disallow and block external communication of application related data to and/or from the TCU 304 through the VAN 102.

Upon assigning a block port 1122B, 1124B of the router 1112, 1114 to disallow the application to be wirelessly executed, the method may proceed to block 1210, wherein the method may include suggesting different wireless service provider plans. In one embodiment, the router application 302 may be configured to present a human machine interface through the head unit 104A and/or one or more driver or portable devices 104D, 104E and 104F.

In particular, the application 304 may present a user interface through the devices 104 where a number of suggested wireless provider service plan option may be provided and may be presented as selectable to enable the user to access the application through the VAN 102. For example, the user may be presented with a number of different billing options that relate to upgrade to a data plan through the wireless data provider that may allow the inputted application be accessible. If the user chooses to upgrade their data plan, the network server 1108 may be updated accordingly, and may thereby provide related data to the end point resolver server 308 and/or directly to the data manager 1102 to thereby update the allow list 1104 to enable access to the one or more requested applications.

With reference again to block 1206, if it is determined that the application is allowed, the method may proceed to block 1212, wherein the method may include assigning an allow port of a router 1112, 1114 of the TCU 304 to allow the application to be wirelessly executed. As discussed above, the router ports 1122A and 1124A may be configured as an allow ports that may be assigned by the router application 302 to allow data to be communicated through the VAN 102 based on a determination that particular applications, URLs, and/or internet resources are not included within the allow list 1104.

In one configuration, if it is determined by the app service manager 1116 that the particular application inputted by the user is not included within the allow list 1104, the app service manager 1116 may be configured to communicate respective data to the TCU 304 of the vehicle 100 to activate the allow port 1122A of the first router 1112 or the allow port 1124A of the second router 1114 to enable communication of application related data to and/or from the TCU 304 through the VAN 102. In other words, as the application is included as being accessible through the data plan, data associated with the input to access and execute the application through the data plan is sent through the allow port 1122A of the first router 1112 or the allow port 1124A of the second router 1114 to allow communication of application related data to and/or from the TCU 304 through the VAN 102.

Upon assigning an allow port of the router 1112, 1114 to allow the application to be wirelessly executed, the method may proceed to block 1214, wherein the method may include presenting an application interface through the head unit 104A, rear entertainment system 104B, and/or portable devices 104D, 104E and 104F connected to the vehicle 100 through a hot spot. In an exemplary embodiment, the router application 302 may be configured to utilize the app service manager 1116 to communicate user interface data to the head unit 104A to utilize the head unit 104A and/or or rear entertainment system 104B to present a human machine interface of the application to the user.

In another embodiment, the router application 302 may be configured to utilize the app service manager 1116 to communicate user interface data to the hot spot service manager 1118 to utilize one or more portable devices 104D, 104E, and 104F that are connected to the vehicle 100 through a hot spot connection to present the human machine interface of the application to the user. Accordingly, the user may utilize the application through the VAN 102 using the data plan that is provided by one or more wireless data providers and associated with the vehicle 100 and/or the user.

Figure 13:
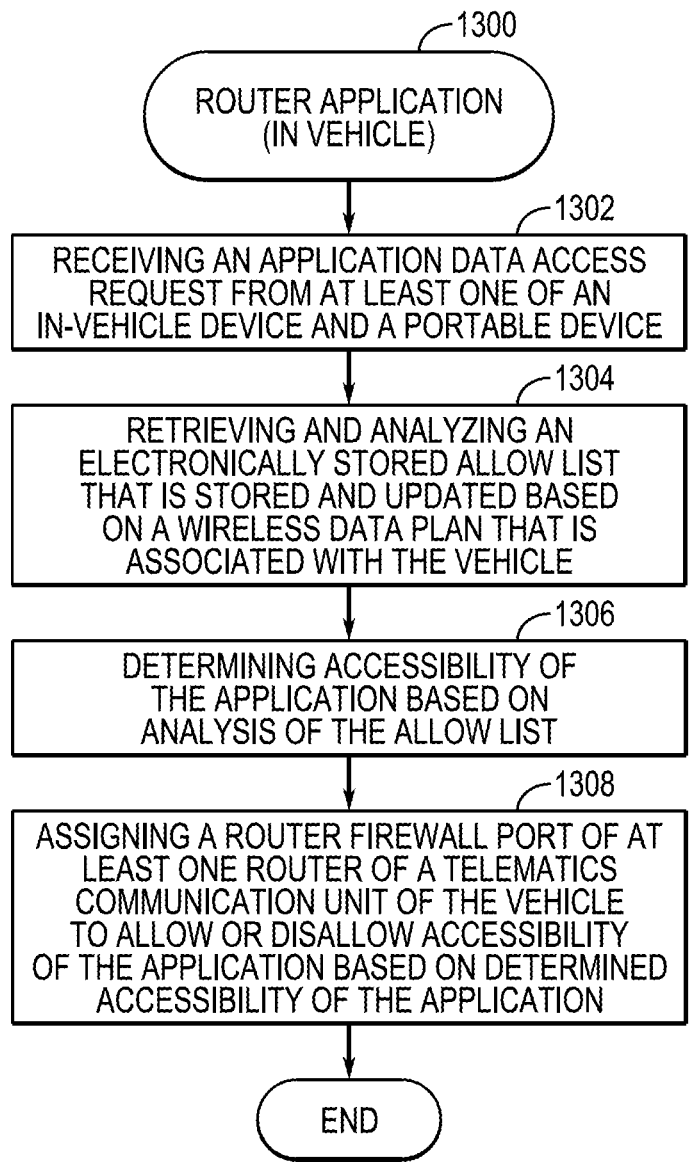
FIG. 13 is a process flow diagram of a method for processing a resource identifier request in a vehicle according to an exemplary embodiment of the present disclosure.

FIG. 13 is a process flow diagram of a method for processing a resource identifier request in a vehicle according to an exemplary embodiment of the present disclosure. The method of FIG. 12 is for illustrative purposes and should not be construed as limiting. The method of FIG. 13 may begin at block 1300. The processes are from the perspective of the router application 302 within the vehicle.

The method may include block 1302 which includes receiving an application data access request from at least one of an in-vehicle device and a portable device. The method may proceed to block 1304 which includes retrieving and analyzing an electronically stored allow list 1104 that is stored and updated based on a data plan that is associated with the vehicle 100. The method may proceed to block 1306 which includes determining accessibility of the application based on analysis of the allow list. The method may proceed to block 1308 which includes assigning a router port of at least one router of a telematics communication unit of the vehicle to allow or disallow accessibility of the application based on determined accessibility of the application.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for processing a resource identifier request in a vehicle, comprising:
   receiving an application data access request for accessing an application from at least one of an in-vehicle device and a portable device;
   retrieving and analyzing an electronically stored allow list that is stored on a local memory of the vehicle and associated with a vehicle identification number of the vehicle, and the allow list is updated based on a wireless data plan that is associated with the vehicle;
   synchronizing the allow list periodically with a service endpoint resolver that maintains a global list of allowable URLs and a status of an active vehicle plan of the vehicle, wherein the synchronization updates the allow list based on the wireless data plan;
   determining accessibility of the application based on analysis of the allow list; and
   assigning a router port of at least one router of a telematics communication unit of the vehicle to allow or disallow accessibility of the application based on determined accessibility of the application, wherein
   the determination of accessibility is handled locally by a router application of the vehicle and the router application checks the stored allow list before communicating with a server communicatively coupled to the service endpoint resolver.

2. The computer-implemented method of claim 1, wherein receiving the application data access request includes receiving the application data access request through an app service manager of the vehicle when the application data access request is from the in-vehicle device, wherein the app service manager is configured to receive a resource identifier from the in-vehicle device that is associated with an input request to execute and access the application.

3. The computer-implemented method of claim 2, wherein receiving the application data access request includes receiving the application data access request through a hot spot service manager of the vehicle when the application data access request is from the portable device, wherein the hot spot service manager manages a hot spot connection between the vehicle and the portable device.

4. The computer-implemented method of claim 3, wherein the hot spot service manager communicates with the app service manager to provide the resource identifier from the portable device that is associated with the input request to execute and access the application.

5. The computer-implemented method of claim 1, wherein the allow list includes a list of application names, associated internet protocol addresses, and associated permissions to allow access to at least one of: a vehicle application, an applet, an application interface, a portable application, and an application web interface.

6. The computer-implemented method of claim 1, wherein the allow list is updated based on the wireless data plan that is associated with the vehicle, wherein the wireless data plan is provided at different price points to provide access to particular applications, types of applications, and application data bandwidth service levels.

7. The computer-implemented method of claim 1, wherein assigning the router port of at least one router of the telematics communication unit includes assigning an allow port of the at least one router to allow the application to be wirelessly executed through at least one of the in-vehicle device and the portable device connected through a vehicle area network upon determining that the application is included within the allow list.

8. The computer-implemented method of claim 7, wherein assigning the router port of the at least one router of the telematics communication unit includes assigning a block port of the at least one router to disallow the application to be wirelessly executed through at least one of the in-vehicle device and the portable device connected through the vehicle area network upon determining that the application is not included within the allow list, and
when it is determined that the application is not included within the allow list, the router application suggests a similar alternative application, that is within the allow list, to be accessed.

9. The computer-implemented method of claim 8, further including presenting a user interface through at least one of the in-vehicle device and the portable device upon determining that the application is included within the allow list, wherein the user interface includes a number of suggested wireless provider service plan options that are selectable to enable access of the application through the vehicle area network.

10. A system for processing a resource identifier request in a vehicle, comprising:
a memory storing instructions when executed by a processor cause the processor to:
receive an application data access request for accessing an application from at least one of an in-vehicle device and a portable device;
retrieve and analyze an electronically stored allow list that is stored on a local memory of the vehicle and associated with a vehicle identification number of the vehicle, and the allow list is updated based on a wireless data plan that is associated with the vehicle;
synchronizing the allow list periodically with a service endpoint resolver that maintains a global list of allowable URLs and a status of an active vehicle plan of the vehicle, wherein the synchronization updates the allow list based on the wireless data plan;
determine accessibility of the application based on analysis of the allow list; and
assign a router port of at least one router of a telematics communication unit of the vehicle to allow or disallow accessibility of the application based on determined accessibility of the application, wherein
the determination of accessibility is handled locally by a router application of the vehicle and the router application checks the stored allow list before communicating with a server communicatively coupled to the service endpoint resolver.

11. The system of claim 10, wherein receiving the application data access request includes receiving the application data request through an app service manager of the vehicle when the application data access request is from the in-vehicle device, wherein the app service manager is configured to receive a resource identifier from the in-vehicle device that is associated with an input request to execute and access the application.

12. The system of claim 11, wherein receiving the application data access request includes receiving the application data request through a hot spot service manager of the vehicle when the application data access request is from the portable device, wherein the hot spot service manager manages a hot spot connection between the vehicle and the portable device.

13. The system of claim 12, wherein the hot spot service manager communicates with the app service manager to provide the resource identifier from the portable device that is associated with the input request to execute and access the application.

14. The system of claim 10, wherein the allow list includes a list of application names, associated internet protocol addresses, and associated permissions to allow access to at least one of: a vehicle application, an applet, an application interface, a portable application, and an application web interface.

15. The system of claim 10, wherein the allow list is updated based on the wireless data plan that is associated with the vehicle, wherein the wireless data plan is provided at different price points to provide access to particular applications, types of applications, and application data bandwidth service levels.

16. The system of claim 10, wherein assigning the router port of at least one router of the telematics communication unit includes assigning an allow port of the at least one router to allow the application to be wirelessly executed through at least one of the in-vehicle device and the portable device connected through a vehicle area network upon determining that the application is included within the allow list.

17. The system of claim 16, wherein assigning the router port of the at least one router of the telematics communication unit includes assigning a block port of the at least one router to disallow the application to be wirelessly executed through at least one of the in-vehicle device and the portable device connected through the vehicle area network upon determining that the application is not included within the allow list, and
when it is determined that the application is not included within the allow list, the router application suggests a similar alternative application, that is within the allow list, to be accessed.

18. The system of claim 17, further including presenting a user interface through at least one of the in-vehicle device and the portable device upon determining that the application is included within the allow list, wherein the user interface includes a number of suggested wireless provider service plan options that are selectable to enable access of the application through the vehicle area network.

19. A non-transitory computer readable storage medium storing instructions that when executed by a computer, which includes a processor perform a method, the method comprising:
receiving an application data access request for accessing an application from at least one of an in-vehicle device of a vehicle and a portable device;
retrieving and analyzing an electronically stored allow list that is stored on a local memory of the vehicle and associated with a vehicle identification number of the vehicle, and the allow list is updated based on a wireless data plan that is associated with the vehicle;
synchronizing the allow list periodically with a service endpoint resolver that maintains a global list of allowable URLs and a status of an active vehicle plan of the vehicle, wherein the synchronization updates the allow list based on the wireless data plan;
determining accessibility of the application based on analysis of the allow list; and assigning a router port of at least one router of a telematics communication unit of the vehicle to allow or disallow accessibility of the application based on determined accessibility of the application, wherein the determination of accessibility is handled locally by a router application of the vehicle and the router application checks the stored allow list before communicating with a server communicatively coupled to the service endpoint resolver.

20. The non-transitory computer readable storage medium of claim 19, wherein the allow list includes a list of application names, associated internet protocol addresses, and associated permissions to allow access to at least one of: a vehicle application, an applet, an application interface, a portable application, and an application web interface.

* * * * *